(12) United States Patent
Varadharajan

(10) Patent No.: US 11,788,645 B2
(45) Date of Patent: Oct. 17, 2023

(54) WATER FLOW CONTROL ASSEMBLY

(71) Applicant: Ponnudurai Varadharajan, Coimbatore (IN)

(72) Inventor: Ponnudurai Varadharajan, Coimbatore (IN)

( * ) Notice: Subject to any disclaimer, the term of this patent is extended or adjusted under 35 U.S.C. 154(b) by 0 days.

(21) Appl. No.: 17/682,110

(22) Filed: Feb. 28, 2022

(65) Prior Publication Data
US 2022/0275880 A1     Sep. 1, 2022

Related U.S. Application Data

(60) Provisional application No. 63/154,083, filed on Feb. 26, 2021.

(51) Int. Cl.
| F16K 31/46 | (2006.01) |
| F16K 31/62 | (2006.01) |
| E03C 1/05  | (2006.01) |

(52) U.S. Cl.
CPC ............ F16K 31/465 (2013.01); E03C 1/052 (2013.01); F16K 31/62 (2013.01)

(58) Field of Classification Search
CPC ...... F16K 31/465; F16K 31/62; F16K 31/605; E03C 1/052
See application file for complete search history.

(56) References Cited

U.S. PATENT DOCUMENTS

| 1,093,452 | A | * | 4/1914 | Metcalf | G05D 16/0683 |
| | | | | | 251/243 |
| 1,627,020 | A | * | 5/1927 | Dougherty | F16K 31/62 |
| | | | | | 251/48 |
| 2008/0053542 | A1 | * | 3/2008 | Cheng | F16K 11/0787 |
| | | | | | 251/294 |
| 2014/0131604 | A1 | * | 5/2014 | Walker | F16K 31/62 |
| | | | | | 251/213 |
| 2021/0404157 | A1 | * | 12/2021 | Torres | E03C 1/052 |

* cited by examiner

*Primary Examiner* — Marina A Tietjen
(74) *Attorney, Agent, or Firm* — Dergosits & Noah LLP; Todd A. Noah

(57) ABSTRACT

An apparatus and kit are provided for remotely controlling the flow of a valve in a faucet or shower. The user may remotely control flow by actuating a foot pedal, which pulls a cable causing the valve to open. When the cable is released, springs force the valve closed. Temperature may be remotely controlled as well by the actuation of a separate foot pedal, in which rotation of the foot pedal is transferred by cables to cause rotation of the valve and the corresponding temperature change of the flow.

20 Claims, 22 Drawing Sheets

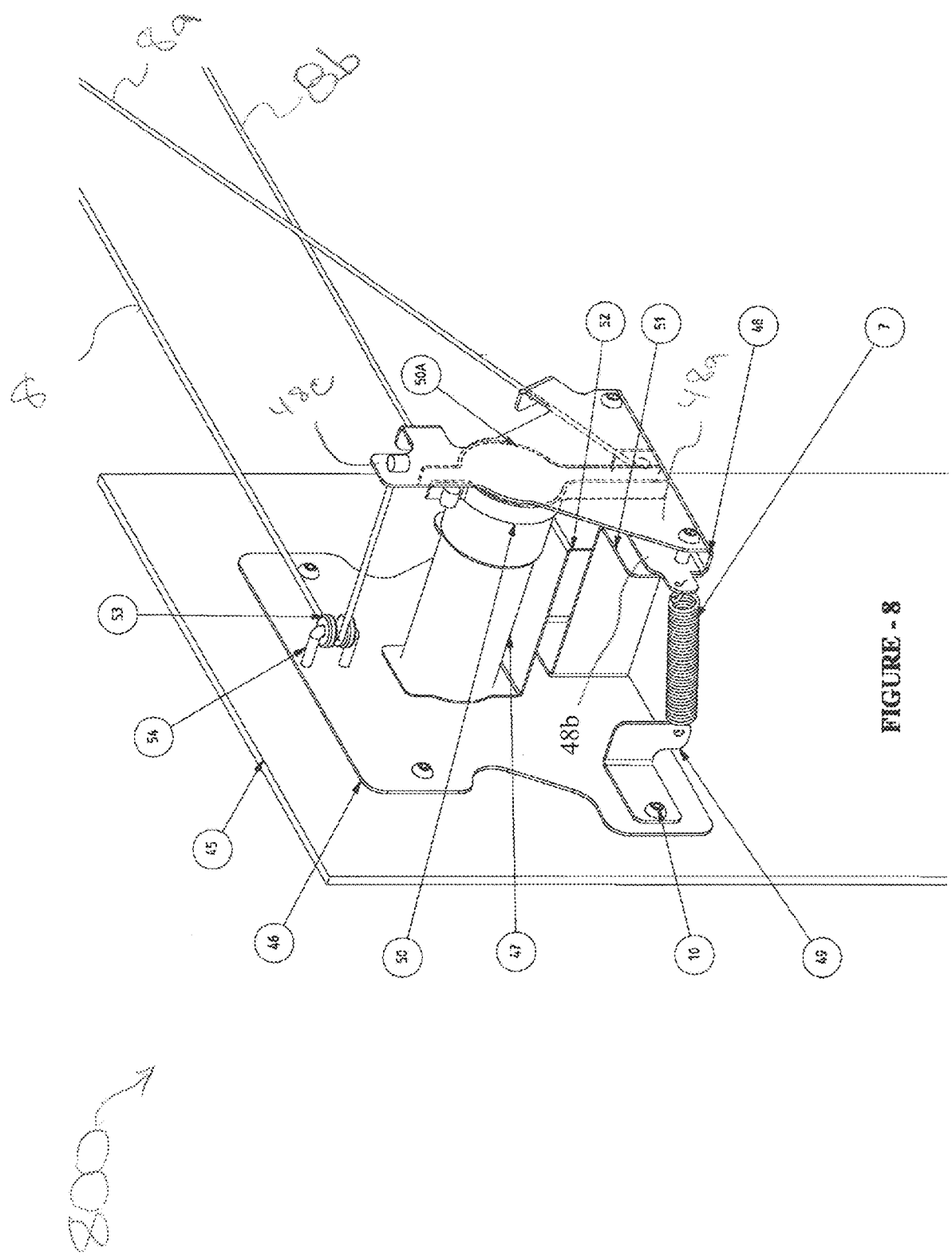

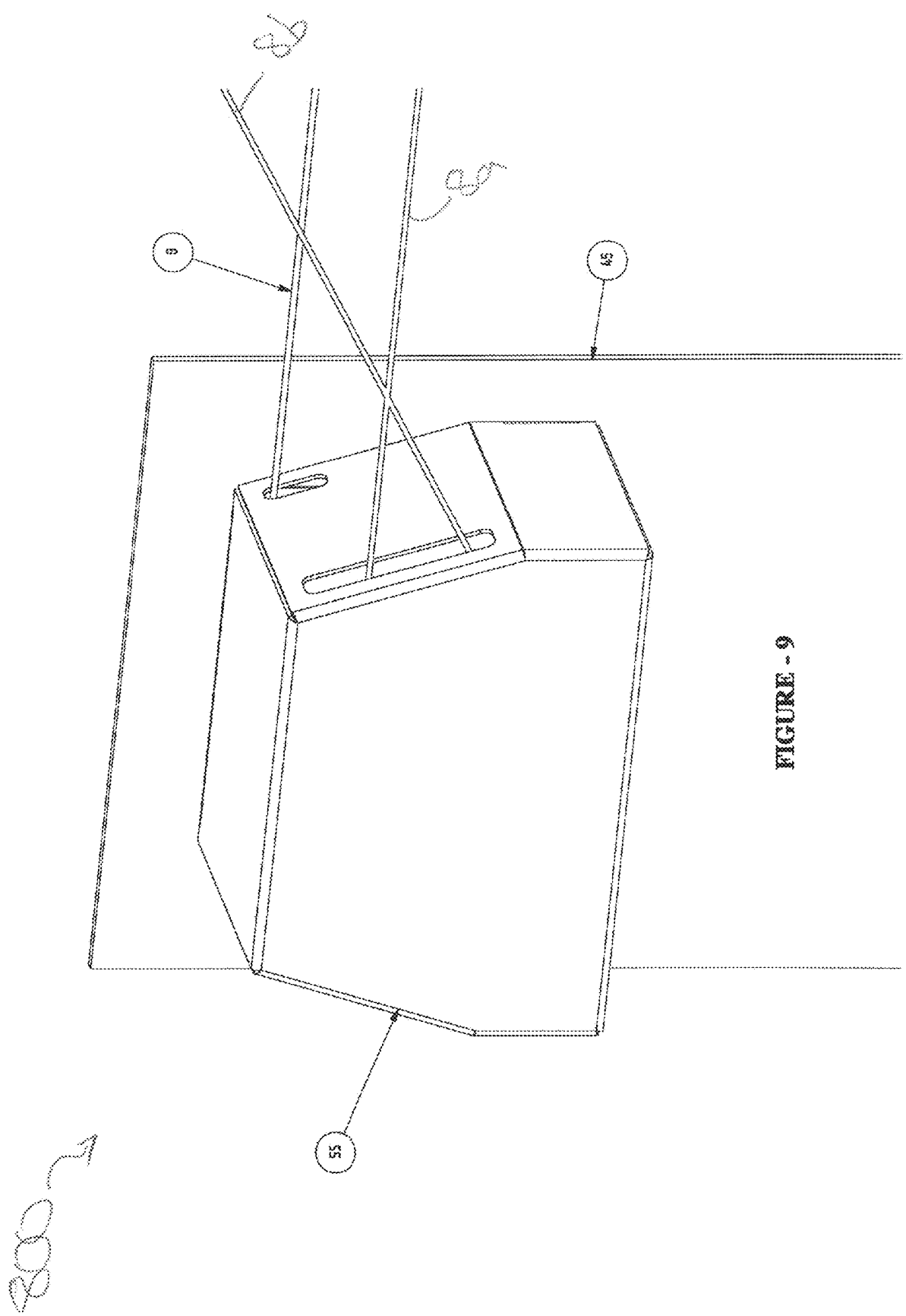

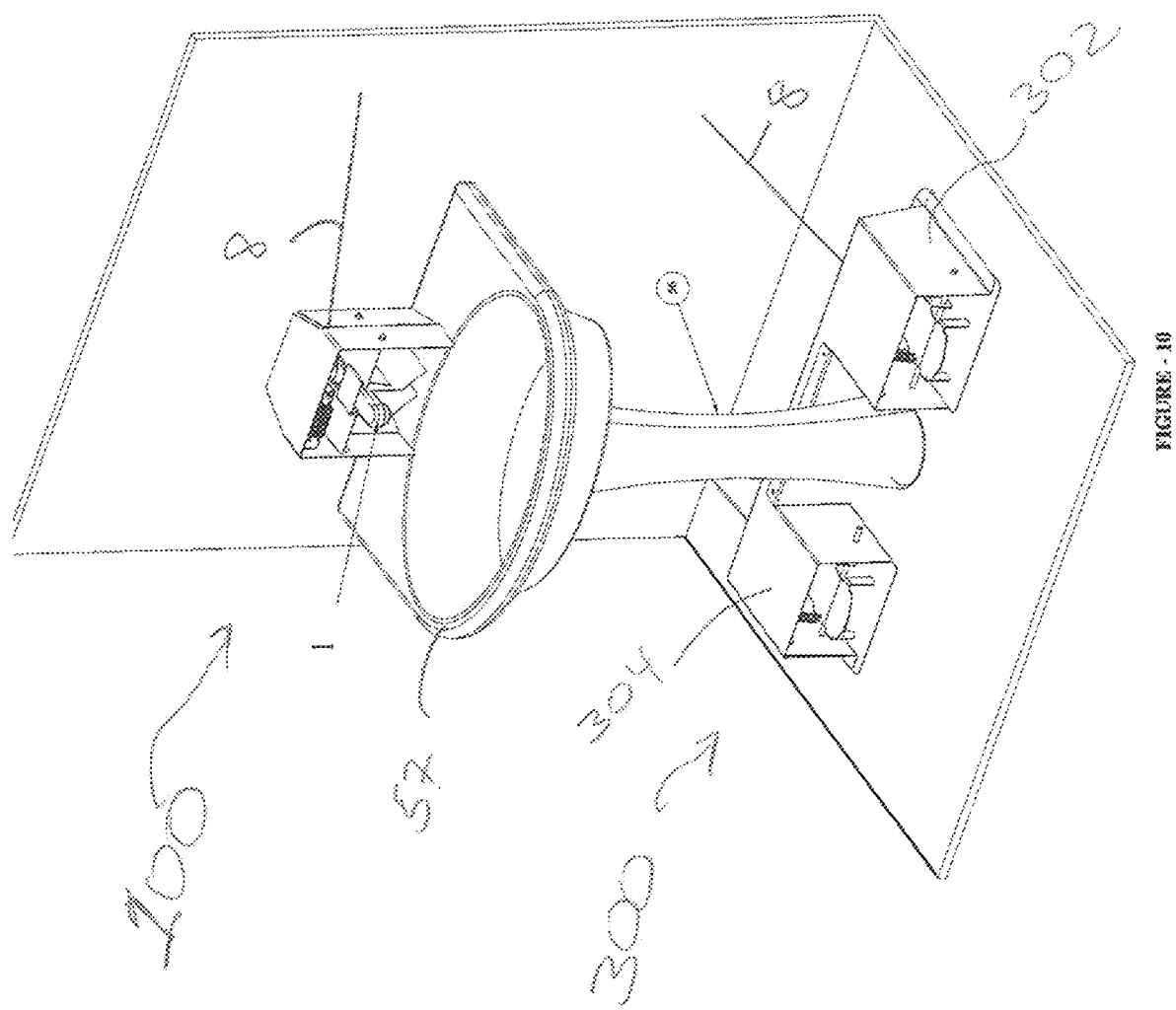

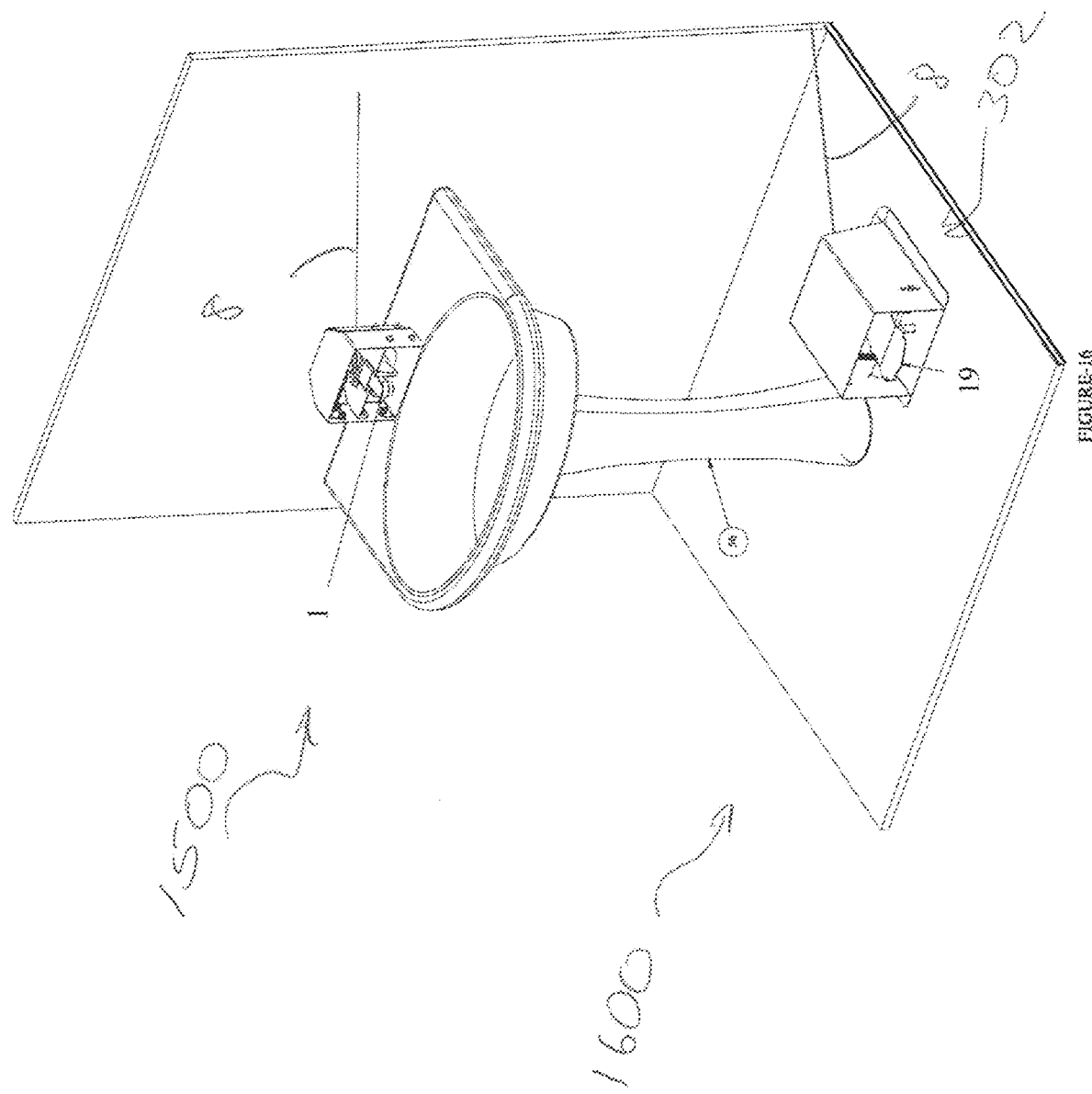

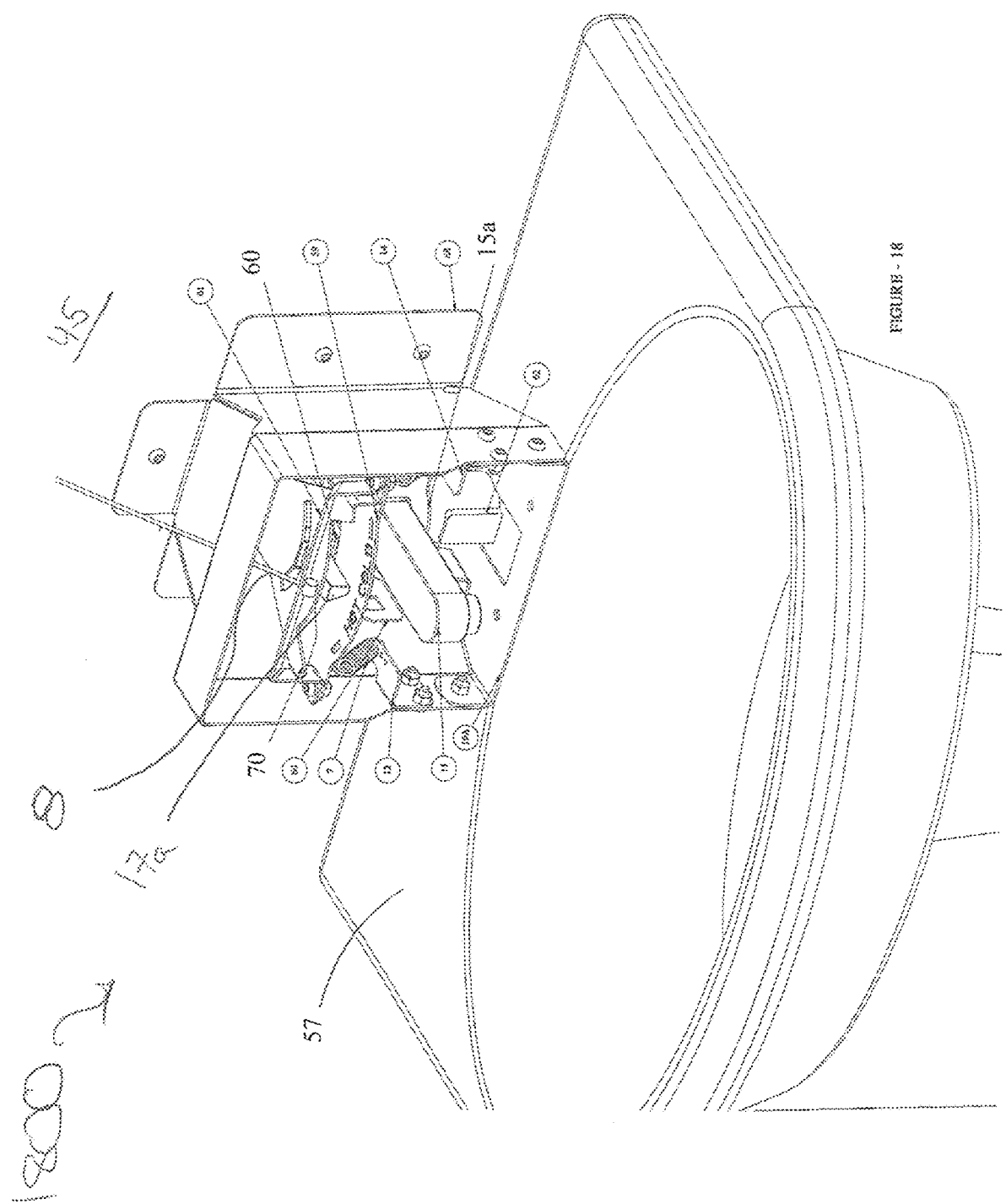

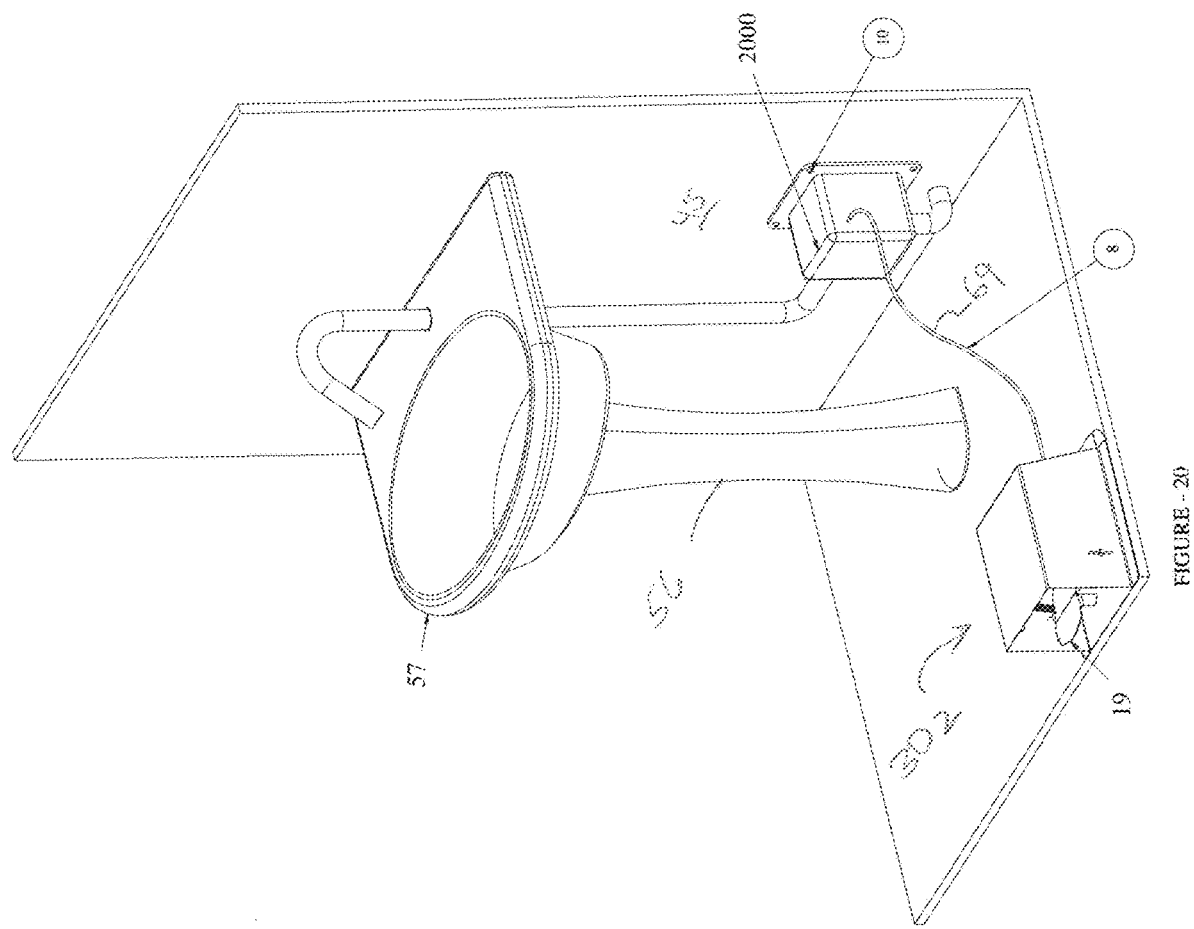

WATER FLOW CONTROL ASSEMBLY

CROSS-REFERENCE TO RELATED CASES

This application claims priority to U.S. Provisional Patent Application No. 63/154,083, filed Feb. 26, 2021, which is hereby incorporated by reference in its entirety.

FIELD OF THE INVENTION

The present subject matter relates generally to a wash basin or shower and more specifically to an apparatus for controlling the flow of water supplied to the wash basin or shower.

BACKGROUND

Typically, faucets (also known in places as "taps") for dispensing water for, e.g., the washing of hands and showing, are operated by hand—with the hand either manually or electrically actuating the faucet. With such systems, every time a user touches the faucet to actuate it, the user may become contaminated with pathogens, such as viruses and bacteria.

It may be that, with some electrically actuated faucets, the wiring could be extended or modified to not require the use of hands. But there are or will be installations where wiring is not practically feasible or otherwise require extensive modifications required to accomplice at a later stage. For example, electrically operated faucets with sensors need electrical energy and wiring for control and actuation. This may be a costly investment, may require undesired maintenance, and may not function if power is not available.

Furthermore, when additional time is required for thoroughness, the undue use of water should be conserved. For example, a soap or cleaning agent may need to remain on the hands for a relatively longer period of time, but water need not flow that entire time. Still, in such cases, it is inconvenient to stop the flow water flow.

Similar issues exist when a user operates a shower to expose the user pathogens and waste water.

Thus, what is needed is an apparatus that allows the user to control the flow of water without using their hands.

BRIEF DESCRIPTION OF THE DRAWINGS

The embodiments are illustrated by way of example and not limitation in the accompanying drawings, in which like references indicate similar elements, and in which:

FIG. 8 is an upper front left perspective view illustrating an aspect of an embodiment of a water flow actuator assembly;

FIG. 9 is an upper front right perspective view illustrating an aspect of the embodiment of a water flow actuator assembly of FIG. 8;

FIG. 10 is a front right perspective view illustrating a use case for embodiments of water flow control and actuator assemblies;

FIG. 16 is an upper front right perspective view illustrating a use case for embodiments of water flow control and actuator assemblies;

FIG. 17 is a front right perspective view illustrating an embodiment of a water flow actuator assembly;

FIG. 18 is a front right perspective view illustrating an embodiment of a water flow actuator assembly;

FIG. 20 is a is an upper front right perspective view illustrating a use case for embodiments of water flow control and actuator assemblies;

DETAILED DESCRIPTION

Embodiments described within disclose mechanisms that allow a user to control the flow of water using cable-connected levers, which may be placed on the floor and activated by the user's feet, or placed on a wall to be active by the user's upper body, e.g., by elbows. Such embodiments reduce the risk to the user of pathogens and facilitate water conservation. Furthermore, it is a feature of the embodiments within that they may retrofitted to already-installed faucets.

Figure 1:
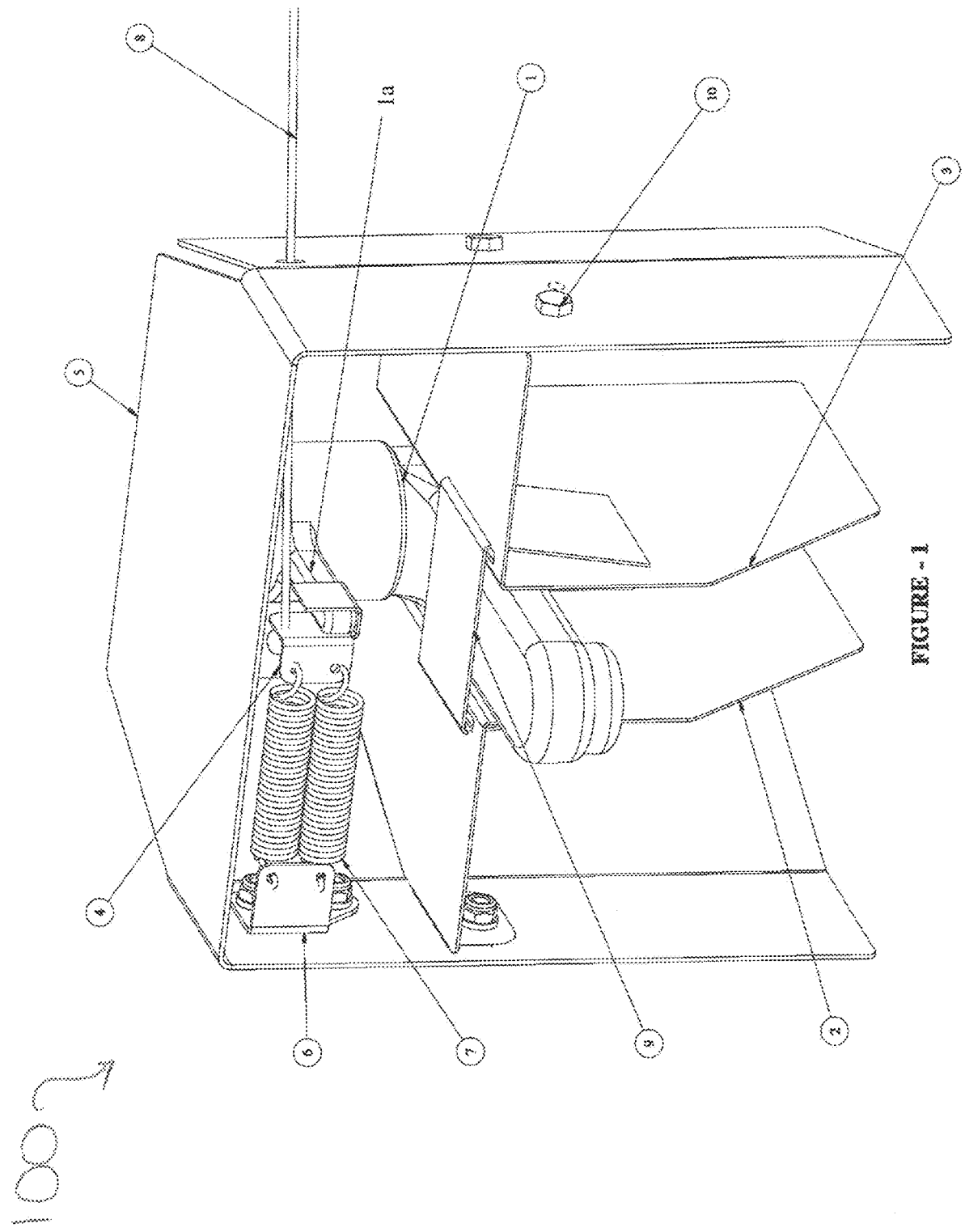
FIG. 1 is a front right perspective view illustrating an embodiment of a water flow actuator assembly.

FIG. 1 is a front right perspective view illustrating an embodiment of a water flow actuator assembly 100. In FIG. 1, a single lever faucet 1 includes a control lever 1a. Actuator assembly 100 is connected to faucet 1 and provides the ability to control faucet 1 without touching lever 1a. Actuator assembly 100 includes an outer cover 5 and the elements connecting cover 5 to faucet 1. The connection is as follows. Cover 5 includes a left bracket 2 and a right bracket 3 attached by fasteners 10. Left bracket 2 and right bracket 3 are connected by a c-lock plate 9 with tines passing through slots in each bracket. Actuator springs 7 are connected to outer cover 5 by a spring bracket 6 and connected to lever 1a by a spring bracket 4. A control cable 8 is passed through outer cover 5 and connected to spring bracket 4.

In FIG. 1, faucet 1 is controlled by rotating lever 1a to the right to start or increase flow and to the left to decrease or stop flow. To initiate flow, a user pulls on cable 8, creating sufficient tension to overcome actuator springs 7 and move handle 1a to the right. Actuator springs 7 are sized to provide sufficient tension to cause lever 1a to return from slightly-on, and full-on, to off, which means at least enough tension to overcome the friction of lever 1a and the added friction of a relaxed cable 8. The user modifies the flow by adjusting the tension provided in cable 8, which moves lever 1a until counterbalanced by tension in actuator springs 7.

Outer cover 5 provides a base against which actuator springs 7 and cable 8 operate. In causing lever 1a to return to the off position shown, the force of actuator springs 7 are transmitted against faucet 1 through outer cover 5 and left bracket 2. In causing lever 1a to open to allow flow, the vector of cable 8 to spring bracket 4 is determined by the position of a port in outer cover 5.

In the embodiment, shown in FIG. 1, cable 8 is depicted as a bare cable. As such, tension between points of restraint in the cable (e.g., the port in outer cover 5) is transmitted by cable 8 being taut and straight. However, in embodiments, cable 8 (and similar cables 8a, 8b, etc.) may be surrounded by a cable housing (e.g., cable housing 69, FIG. 11A) which allows the cable to be serpentine between the covers of control/actuator assembly pairs, such as between the covers or housings of the various embodiments, with the cable housing ending at the housing or cover (e.g., cover 11a, FIG. 11A) and cable 8 passing through to the point of attachment (e.g., lever 17a, FIG. 11A) at the actuator assembly end and, at the control assembly end, cable housing 69 ending at the cover (e.g., cover 18, FIG. 3) and cable 8 passing through to the point of attachment (e.g., flange 306, FIG. 3)). Such cabling is known in the art (e.g., bicycle brake and derailleur cabling) and the embodiments discussed with regard to bare cable 8 should be understood to include sleeved cable such as in FIG. 11A and FIG. 11B. That is, cable 8 may be sleeved between actuator assemblies and corresponding control assemblies (i.e., actuator assemblies: 100 (FIG. 1), 200 (FIG. 2), 800 (FIG. 8), 1100 (FIG. 11A), 1200 (FIG. 12A), 1500 (FIG. 15), 1800 (FIG. 18), and 1900 (FIG. 19); and control assemblies: 300 (FIG. 3), 400 (FIG. 4), 500 (FIG. 5), 600 (FIG. 6), 700 (FIG. 7), 1400 (FIG. 14), and 1600 (FIG. 16)).

In FIG. 1 (and the embodiments of FIGS. 2, 8, 11A, 12, 15, 18, and 19) actuator springs 7 are shown configured to render the faucet normally closed. However, embodiments include orientations in which the springs are configured to render the faucet normally open. In such embodiments, the control assembly at the other end of cable 8 may include a latch holding that end of cable 8 in a position that provides cable 8 with sufficient tension to overcome actuator springs 7 and maintain lever 1a in a closed position.

Figure 2:
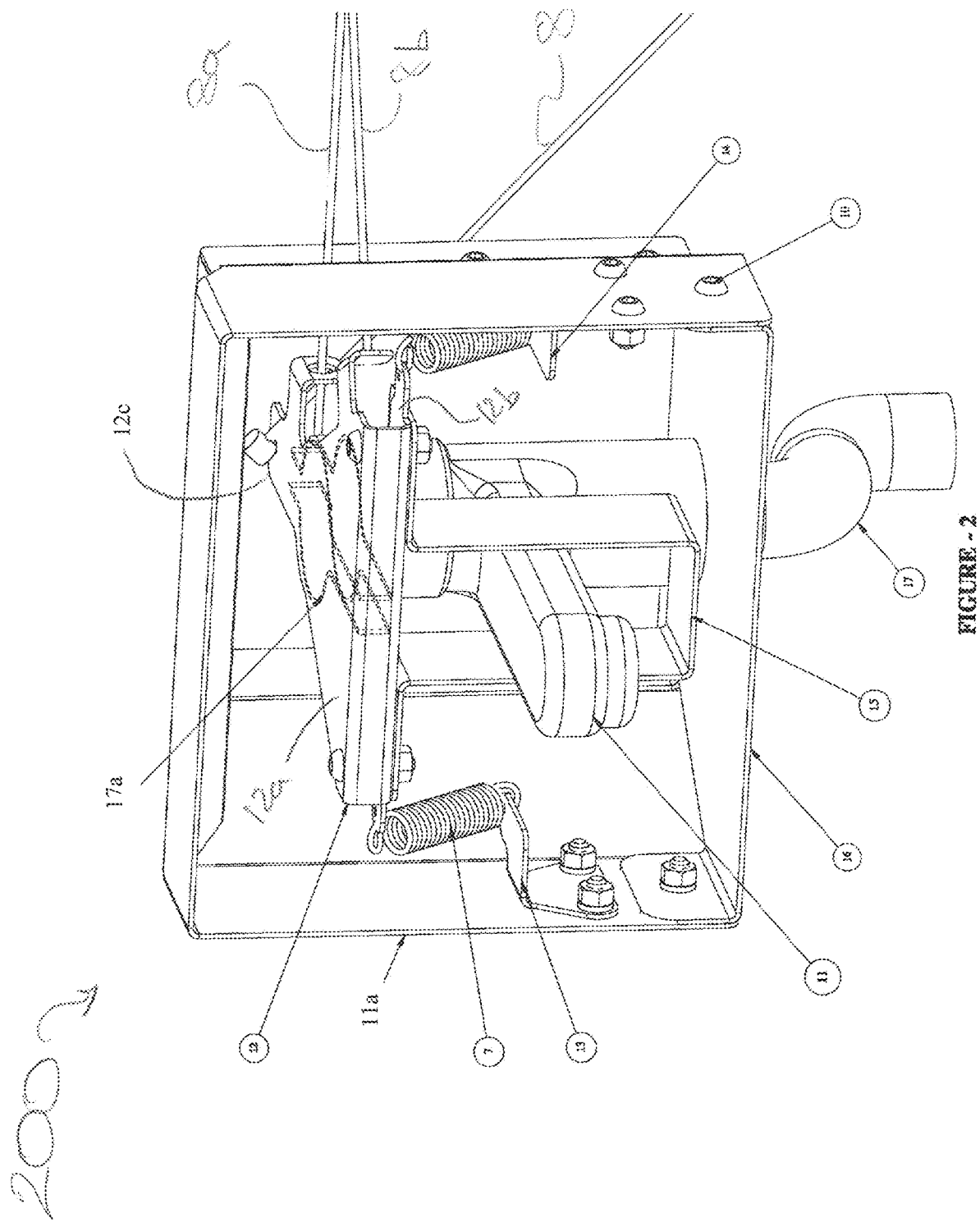
FIG. 2 is a front right perspective view illustrating an embodiment of a water flow and temperature actuator assembly.

FIG. 2 is a front right perspective view illustrating an embodiment of a water flow actuator assembly 200. In FIG. 2, faucet 11 includes a lever 17a that is rotated about a vertical axis to adjust the water temperature, and tilted with respect to a horizontal plane to adjust flow. Temperature control is provided by cables 8a, 8b working in opposition to each other to rotate lever 17a about the vertical axis. Flow control is provided by cable 8 working in opposition to actuator springs 7 to tilt lever 17a within a bracket 12 with respect to the horizontal plane.

In FIG. 2, water flow actuator assembly 200 includes a cover 11a fixed to faucet 11 using fasteners 10 and a bottom bracket 16. In the absence of actuator assembly 200, faucet 11 is controlled by a user tilting a lever 17a with respect to the horizontal plane (up to increase flow and down to decrease flow, typically). Temperature is controlled by the user moving lever 17a left or right (with left being hotter, typically).

In FIG. 2, bracket 12 is affixed about lever 17a such that lever 17a may be rotated within bracket 12 by the action of cable 8a, 8b, and such that lever 17 tilts with bracket 12 when bracket 12 is tilted by the actions of cable 8 and springs 7. In an embodiment, bracket 12 includes upper and lower sections 12a and 12b between which lever 17a may be rotated by cables 8a, 8b, but which cause lever 17a to tilt when bracket 12 is tilted. In other words, rotator bracket 12 is connected to lever 17a such that lever 17a may move within rotator bracket 12 about the vertical axis when acted upon by cables 8a, 8b. However, lever 17a is constrained to tilt with rotator bracket 12 with respect to the horizontal plane when bracket 12 is acted upon by cable 8 or actuator springs 7. Actuator springs 7 are connected to cover 11a by spring brackets 13, 14. Cable 8 is connected through a port (not shown) in cover 11a to a rear lobe 12c of rotator bracket 12. The angle of the connection of cable 8 to rear lobe 12c is configured so that tension in cable 8 draws rear lobe 12c downward, tilting lever 17a upward and increasing flow. In the normally-closed configuration shown, tension in actuator springs 7 is increased when rotator bracket 12 is tilted upward by a sufficient increase in tension in cable 8. A guide bracket 15 connected about faucet 11 to the underside of rotator bracket 12 further constrains rotator bracket 12. Bracket 15 adds constraint to the movement of rotator bracket 12 in that, should bracket 12 rotate about the vertical axis, bracket 15 would contact faucet 11, limiting further such tilting. In other words, guide bracket 15 bounds faucet 11 on both sides to restrict the movement of rotator bracket 12.

In FIG. 2, an optional bend pipe 17 is included. Bend pipe 17 adds distance from faucet 11 to a wall (not shown) behind faucet 11. The distance from a wall provided by bend pipe 17 may facilitate the installation of assembly 200 in instances where faucet 11 is otherwise too close to the wall.

Figure 3:
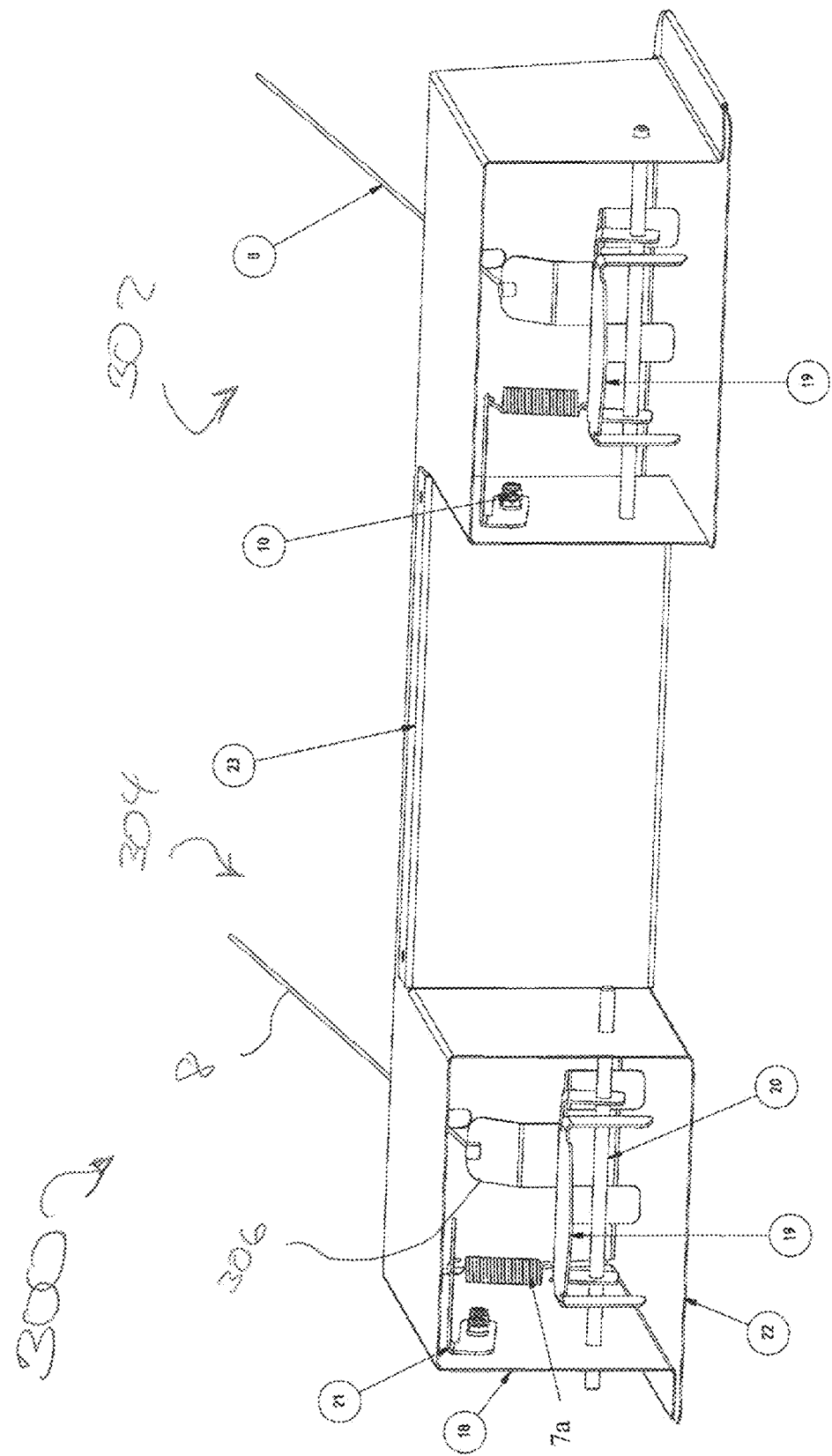
FIG. 3 is a front right perspective view illustrating an embodiment of a water flow control assembly.

FIG. 3 is a front right perspective view illustrating an embodiment of a water flow control assembly 300. FIG. 3 illustrates two identical pedal operated controller assemblies 302, 304, one of which, e.g., pedal control assembly 302, may be used to control water flow actuator assembly 100, and the other of which may be used to control another apparatus, e.g., a second water flow actuator assembly 100, or a soap dispenser (not shown). The following description applies equally to control assemblies 302, 304.

Control assembly 304 includes a pedal top cover plate 18 and a pedal assembly base plate 22, between which are included a foot pedal 19, a hinge pin 20, a control spring 7A, and spring bracket 21. Cable 8 is attached to a flange 306 of foot pedal 19. When the user steps on foot pedal 19, flange 306 is rotated forward about hinge pin 20, pulling on cable 8, which actuates the corresponding assembly (e.g., any of flow actuator assemblies 100, 1100 (FIG. 11), 1200 (FIG. 12A), 1500 (FIG. 15), 1700 (FIG. 17), 1800 (FIG. 18), or 1900 (FIG. 19)). Control spring 7A works in tension to return foot pedal 19 to the unrotated position, which reduces the tension in cable 8. Thus, control spring 7A assists actuator springs 7 to return an actuator assembly, e.g., actuator assembly 100, to the closed position, which stops the flow. In the embodiment, assemblies 302, 304 are shown connected by an optional plate 23, which provides further rigidity and mounting options to the apparatus.

Figure 4:
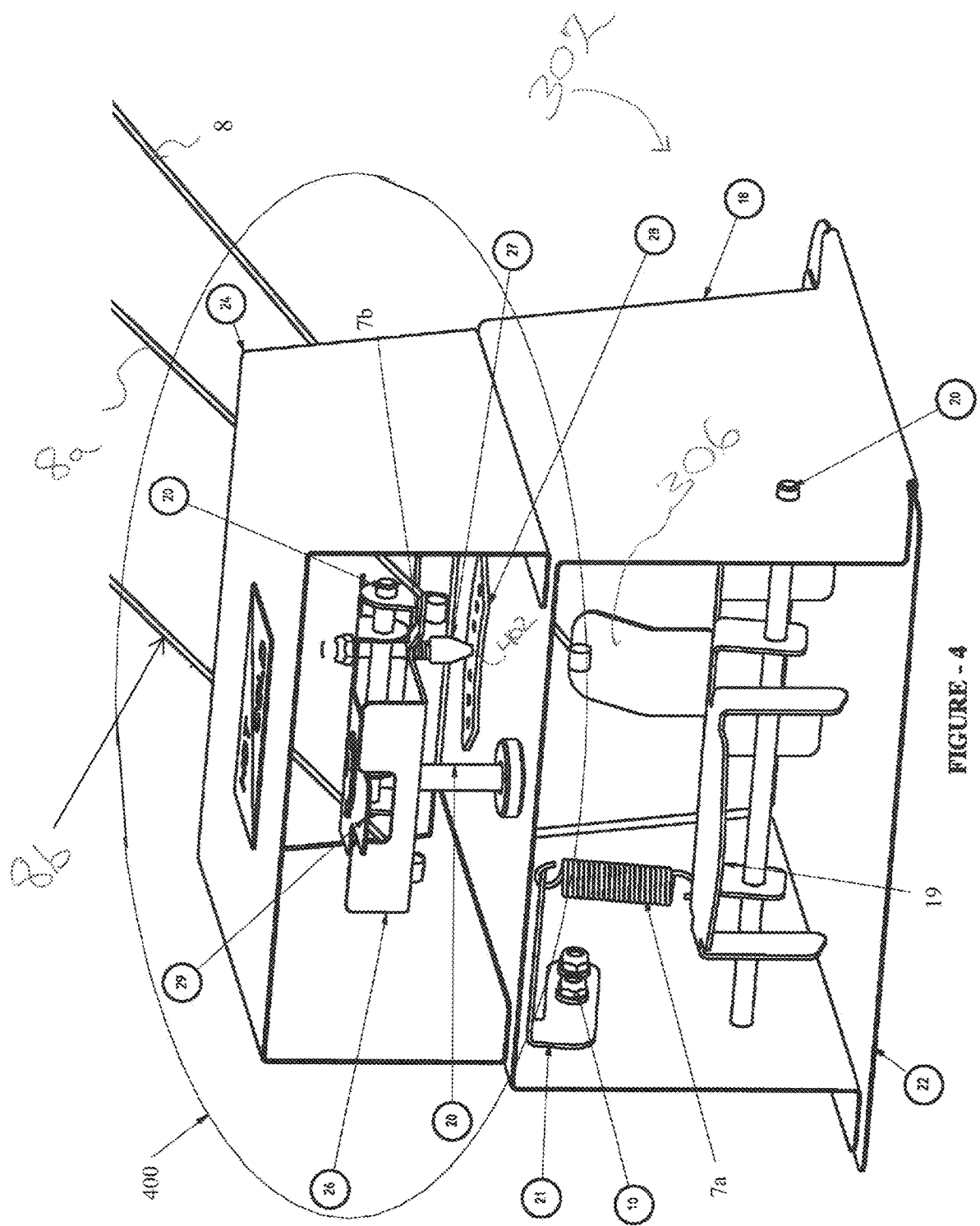
FIG. 4 is a front right perspective view illustrating an embodiment of a water flow and temperature control assembly.

FIG. 4 is a front right perspective view illustrating an embodiment of a water temperature control assembly 400 attached atop water flow control assembly 302. Temperature control assembly 400 provides the user with the ability to control temperature of, e.g., flow actuator assemblies 200 (FIG. 2), 800 (FIG. 8) remotely, by foot pressure against either the right or left side of a rotating foot pedal 26, which actuates cables 8*a*, 8*b* to change water temperature, e.g., as described with regard to actuator assembly 200 of FIG. 2.

In FIG. 4, temperature control assembly 400 includes rotating foot pedal 26, which is connected to cables 8*a*, 8*b*. Rotating foot pedal 26, pivots about an axis defined by a hinge pin 20 to alternately pull or provide slack to cables 8*a*, 8*b*. That is, when the user pushes on the left side of pedal 26, it rotates clockwise atop hinge pin 20 (about the vertical axis), which provides slack to cable 8*b*, and pulls in cable 8*a*. The corresponding movement of cables 8*a*, 8*b* in FIG. 2 would cause lever 17*a* to similarly rotate clockwise about the vertical axis. Thus, the rotational movement of rotating foot pedal 26 is transmitted to faucet lever 17*a*.

In an optional attachment to the embodiment, a tilting plate 29 is connected to rotating foot pedal 26 by a hinge pin 20, which passes through flanges of both tilting plate 29 and rotating foot pedal 26. This allows tilting plate 29 to pivot about hinge pin 20 with respect to rotating foot pedal 26. A lock pin 27 passes through both tilting plate 29 and rotating foot pedal 26 to engage with a depression 402 among multiple depressions in a temperature control plate 28. A spring 7*b* urges pin 27 into depression 402 against rotating foot pedal 26. As shown in FIG. 4, lock pin 27 hinders rotation of rotating foot pedal 26, which works to maintain a temperature setting of lever 17*a*. Also as shown in FIG. 4, a user may use their foot to depress tilting plate 29 to withdrawn lock pin 27 from depression 402. At the same time the user may use their foot to rotate foot pedal 26 and change the temperature setting of lever 17*a*. When the user withdraws their foot from tilting plate 29, spring 7*b* urges lock pin 27 toward temperature control plate 28. If such motion does not deposit pin 27 into a depression, a slight rotation of pedal 26 will cause pin 27 to move into a depression and set the temperature. In embodiments, temperature control plate and pin 27 may be configured to provide a different granularity of temperature settings, e.g., more depressions 402 may be included to increase the potential temperature settings.

Figure 5:
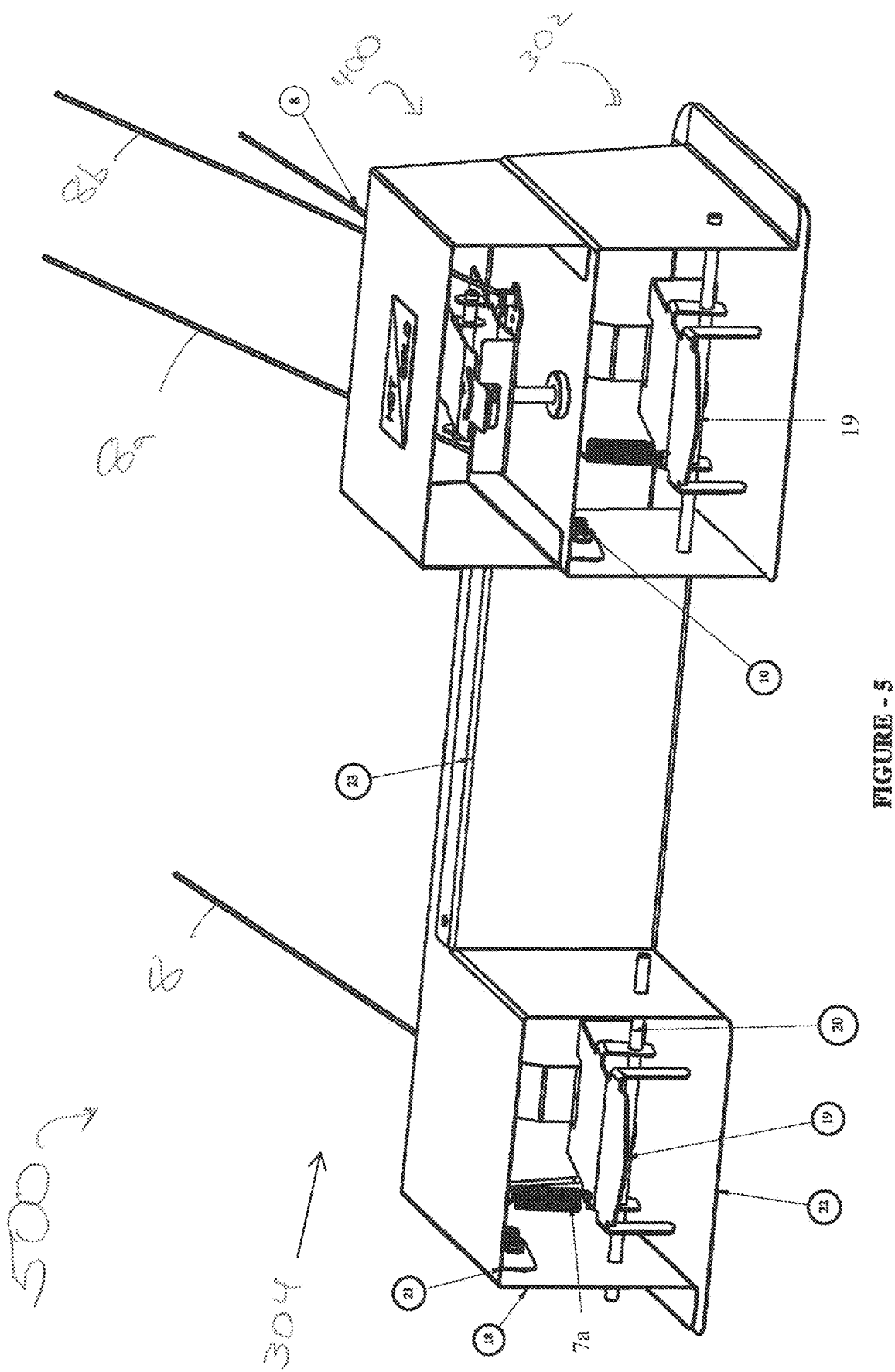
FIG. 5 is a front right perspective view illustrating an embodiment of a water flow control assembly.

FIG. 5 is a front right perspective view illustrating an embodiment of a water flow control assembly 500. Flow control assembly 500 includes flow control assembly 300 (assemblies 302 and 304) and temperature control assembly 400. The construction and operation of assemblies 302, 304, and 400 was described earlier. FIG. 5 illustrates that assembly 500 may be used to control a flow actuator assembly using control assemblies 302 and 400 (as described with respect to FIG. 4 and FIG. 2), which leaves flow control assembly 304 available to control an additional actuator assembly (e.g., assembly 100), or to control an additional actuator, perhaps by using pedal 19 and cable 8 of assembly 304 to actuate a soap dispenser or other dispenser (not shown).

Figure 6:
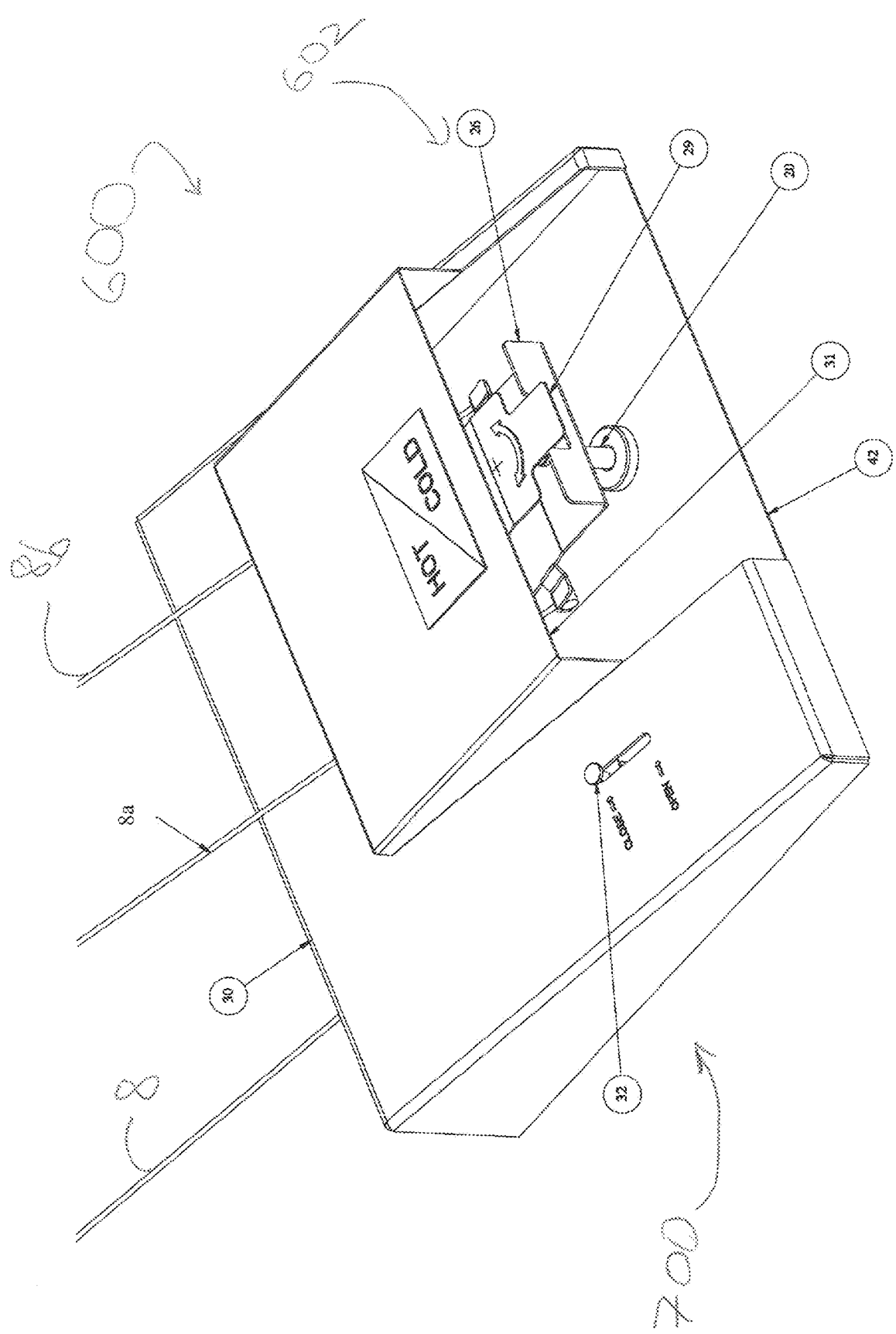
FIG. 6 is an upper front left perspective view illustrating an embodiment of a water flow control assembly.

FIG. 6 is an upper front left perspective view illustrating an embodiment of a water flow control assembly 600. Water flow control assembly 600 includes a temperature control assembly 602 that functions as described with regard to FIG. 4 and FIG. 5. That is, temperature control assembly 602 includes a tilting plate 29 and a rotating foot pedal 26, that are pivotable atop hinge pin 20 to alternately tension or release cables 8*a*, 8*b*, which adjust a temperature setting of a faucet lever, e.g., lever 17*a* of actuator assembly 200. In FIG. 6, temperature control assembly 602 is provided between a pedal top cover 31 and a pedal bottom bracket 42 of flow control assembly 600.

Water flow control assembly 600 further includes a flow control assembly 700 within a cover 30. Flow control assembly 700 includes an open/close pin 32 that may be moved between open and closed positions to either pull or provide slack to cable 8 to control flow actuator assemblies 200 and 800.

The embodiment of FIG. 6 may be used to control the flow and temperature aspects of flow control actuators 200 and 800 (FIG. 8).

Figure 7:
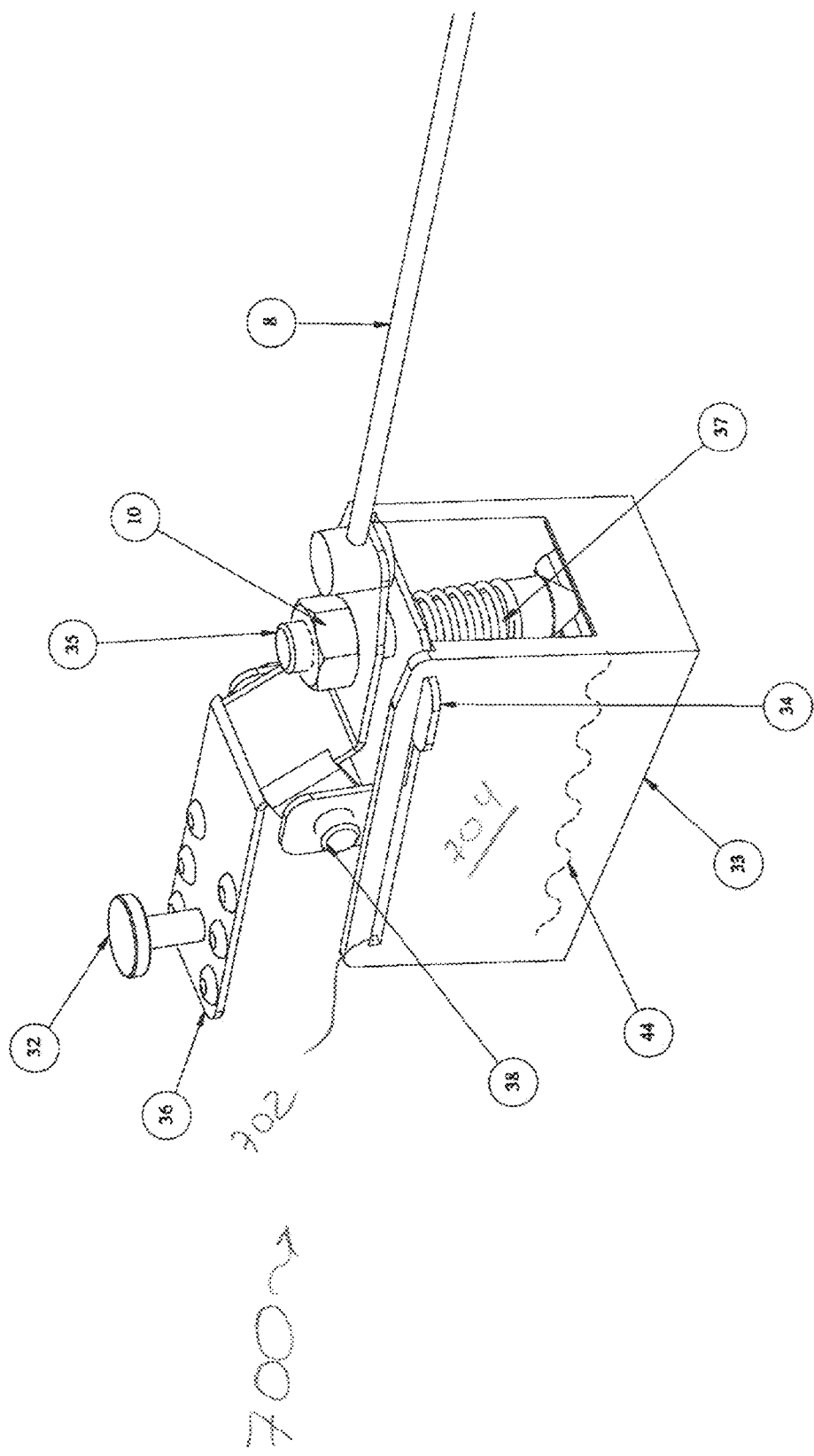
FIG. 7 is an upper rear right perspective view illustrating an aspect of an embodiment of a water flow control assembly.

FIG. 7 is an upper rear right perspective view illustrating aspects of water flow control assembly 700. The right side of assembly 700 is not shown but is identical in construction and function to the left side shown in FIG. 7. In water flow control assembly 700, cable 8 is attached to a flange of a slider pedal 36. Slider pedal 36 is pivotable about a pedal pin 38 that passes through flanges of a slider 34. Slider 34 slides along a track 702 within a housing 704. With housing 704 fixed within control assembly 600, tension in cable 8 may be increased by moving slider pedal 36 rearward (to the left in FIG. 7) and decreased by moving slider pedal 36 forward. Flow in, e.g., actuator 200 or 800 (FIG. 8) would be changed accordingly. To maintain flow at a set flow rate, control assembly 700 further includes a sliding pin 35 and a series of steps or undulations 44. Sliding pin 35 passes through the flange of slider pedal 36 and through slider 34. A slider spring 37 works against slider 34 to urge pin 35 against steps 44. The force of pin 35 within one of steps 44 works to maintain cable 8 at that particular tension, which maintains the flow of the corresponding actuator at a level desired by the user. When the user wishes to change the rate of flow, the user may depress pin 32, causing slider pedal 36 to pivot about pin 38 and withdraw slider pin 35 from steps 44 against the action of spring 37. With slider pin 35 withdrawn from steps 44, pin 32 may be moved forward or backward to adjust the tension in cable 8 and, as a result, the flow from the corresponding actuator.

Flow control assembly 600 may be particularly suited for controlling a shower, since both flow control assembly 700 and temperature control assembly 602 may be foot-operated, and assembly 700 may be set to maintain a desired flow.

FIG. 8 is an upper front left perspective view illustrating an aspect of an embodiment of a water flow actuator assembly 800 in the use case of a shower installation with a shower handle 50 atop a shower valve 47. For reference, flow actuator assembly 800 and flow actuator assembly 200 (FIG. 2) operate and are controlled similarly, with the major exception being that flow actuator assembly 800 is mounted at a 90 degree angle to a wall 45, in comparison to flow actuator assembly, which is depicted as being oriented vertically.

In FIG. 8, shower lever 50 (in dotted lines) rotates about a horizontal axis defined by valve 47 to adjust temperate and tilts with respect to a vertical plane (i.e., the lower part of lever 50 moves toward or from wall 45) to adjust flow.

Flow actuator assembly 800 includes a mounting bracket 46 provided about faucet 47. A control flange 52 extends outward from bracket 46. A rotator bracket 48 is mounted about lever 50. Cables 8*a*, 8*b* are connected through flanges of upper bracket 48*a* to lever 50. Water flow actuator assembly 800 includes spring brackets 49 (a second spring bracket is included on the hidden side of assembly 800—as is shown with respect to assembly 200), and springs 7 connected to flanges of rotator bracket 48. Actuator springs 7 are connected to rotating bracket 48 and spring brackets 49. Cable 8 is connected through a port (FIG. 9) in a cover 55 (FIG. 9) to a rear lobe 48*c* rotator bracket 48. The angle of the connection of cable 8 to rear lobe 48*c* is determined by being routed about a roller pulley 53 (attached to bracket 46 by a mount 54) so that tension in cable 8 draws rear lobe 48c toward wall 45, tilting lever 50 outward and increasing flow.

Bracket 48 is affixed about lever 50 such that lever 50 may be rotated within bracket 48 by the action of cable 8a, 8b, and such that lever 50 tilts with bracket 48 when bracket 48 is tilted by the actions of cable 8 and springs 7. In an embodiment, bracket 48 includes upper and lower sections 48a and 48b between which lever 50 may be rotated by cables 8a, 8b, but which cause lever 50 to tilt when bracket 48 is tilted. In other words, rotator bracket 48 is connected to lever 50 such that lever 50 may move within rotator bracket 48 about the horizontal axis when acted upon by cables 8a, 8b. However, lever 50 is constrained to tilt with rotator bracket 48 with respect to wall 45 when bracket 48 is acted upon by cable 8 or actuator springs 7. In the normally-closed configuration shown, tension in actuator springs 7 is increased when rotator bracket 48 is tilted outward a sufficient increase in tension in cable 8. A guide bracket 51, connected to rotator bracket 48, bounds handle control bracket 52, which further constrains rotator bracket 50 from rotating with respect to the axis of faucet 47. Guide bracket 51 adds constraint to the movement of rotator bracket 48 in that should bracket 48 rotate about the horizontal axis, bracket 51 would contact the flange of control bracket 52, limiting further such tilting. In other words, guide bracket 51 bounds control bracket 52 on both sides to restrict the movement of rotator bracket 48. In an embodiment, a positioning bracket 50a is connected to the faucet-side of outer bracket 48a. Positioning bracket 50a encircles enough of lever 50 to maintain lever 50 in the proper position (shown) without preventing lever 50 from being rotated to adjust temperature.

Flow actuator assembly 800 works to adjust the flow and temperature of valve 47 as follows. Temperature control is provided by cables 8a, 8b working in opposition to each other to rotate lever 50 about the horizontal axis. Flow control is provided by cable 8 working in opposition to actuator springs 7 to tilt rotator bracket 48 (and lever 50 within) with respect to the vertical plane of wall 45.

FIG. 9 is an upper front right perspective view illustrating aspects water flow actuator assembly 800 of FIG. 8. In FIG. 9, actuator assembly 800 is shown to include a cover 55 through which cable 8, 8a, and 8b pass.

FIG. 10 is a front right perspective view illustrating a use case for water flow actuator assembly 100 and water flow control assembly 300. In FIG. 1, flow actuator assembly 100 is attached to faucet 1, which provides water to a wash basin 57 supported by a pedestal 56. Flow actuator assembly 100 is controlled by flow control assembly 302 and cable 8. Control assembly 304 is show available to control an additional device, such as a soap dispenser.

Figure 11A:
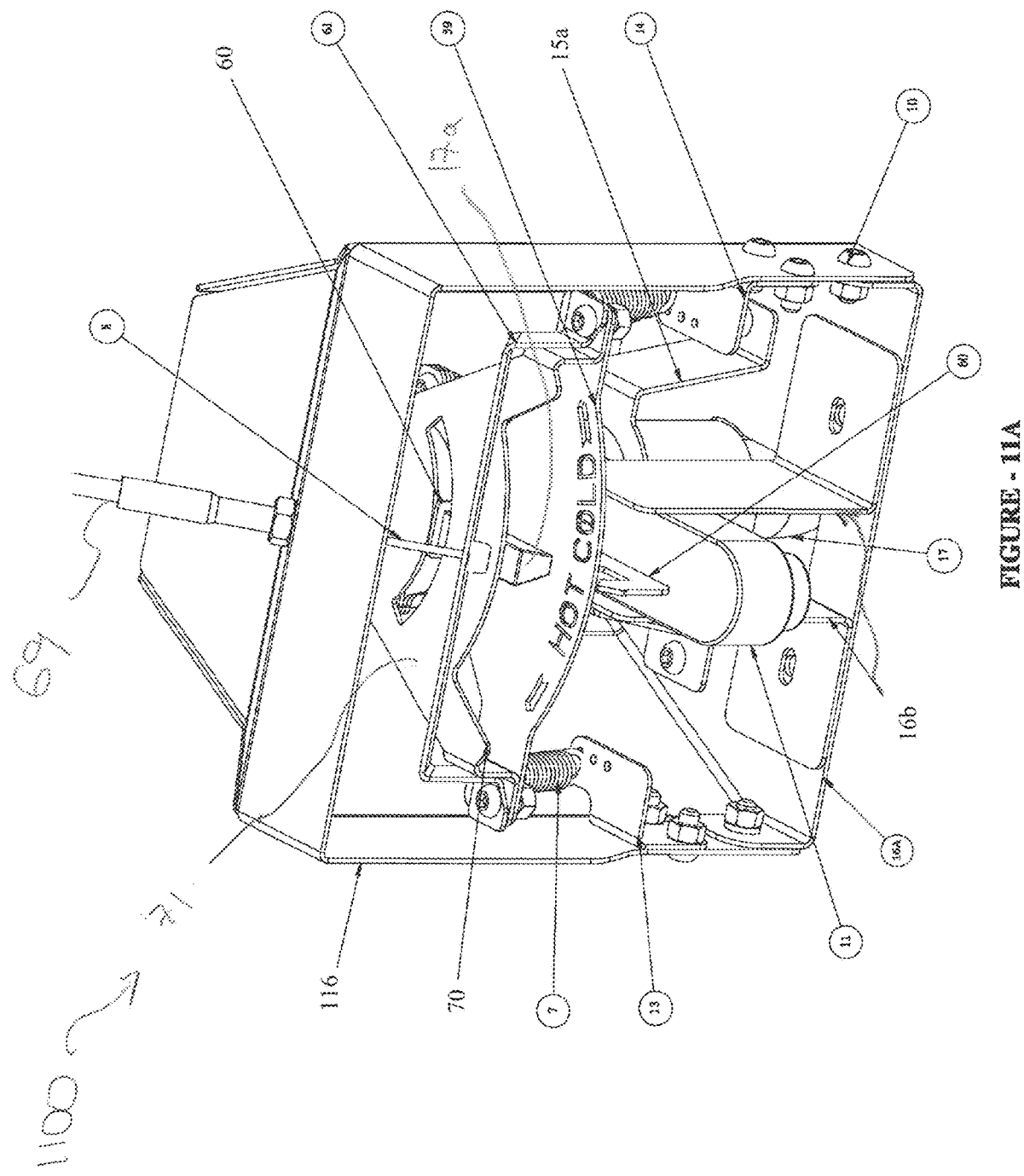
FIG. 11A is an upper front right perspective view illustrating an embodiment of a water temperature and flow actuator assembly.

FIG. 11A is an upper front right perspective view illustrating an embodiment of a water flow actuator assembly 1100. In FIG. 11A, water flow actuator assembly 1100 provides for controlling the flow of faucet 11 (the same faucet as in FIG. 2), in which a lever 17a is rotated about a vertical axis to adjust the water temperature, and tilted with respect to a horizontal plane to adjust flow. For reference, flow actuator assembly 1100 and flow actuator assembly 200 (FIG. 2) operate and are controlled similarly with regard to water flow, with the major exception being that flow actuator assembly 1100 provides access to lever 17a for the user to adjust temperature. That is, flow actuator assembly 1100 controls the flow of faucet 11 by cable 8 working in opposition to actuator springs 7 to tilt lever 17a within a rotator bracket 70 with respect to the horizontal plane.

In FIG. 11A, water flow actuator assembly 1100 includes a cover 11b connected to a bottom bracket 16a with using fasteners 10 and attached to faucet 11. Bracket flanges 16b of bracket 16a further stabilize assembly 1100 about faucet 11. Temperature is controlled by the user moving lever 17a left or right (with left being hotter, typically). Bracket 70 includes an upper bracket 71 and a lower temperature zone display plate 59. Bracket 70 is affixed about lever 17a such that lever 17a may be rotated within bracket 70 by the user to adjust temperature, and such that lever 17a tilts with bracket 70 when bracket 70 is tilted by the actions of cable 8 and springs 7. In other words, rotator bracket 70 is connected to lever 17a such that lever 17a may move within rotator bracket 70 about the vertical axis when acted upon by the user; however, lever 17a is constrained to tilt with rotator bracket 70 with respect to the horizontal plane when bracket 70 is acted upon by cable 8 or actuator springs 7. Actuator springs 7 are connected to cover 11b by spring brackets 13, 14. Cable 8 is connected through a port (not shown) in cover 11b to a cable bracket 61 connected to rotator bracket 70. The angle of the connection of cable 8 to cable bracket 61 is configured so that tension in cable 8 draws cable bracket 61 upward, tilting lever 17a upward and increasing flow. In the normally-closed configuration shown, tension in actuator springs 7 is overcome and rotator bracket 70 is tilted upward by a sufficient increase in tension in cable 8, which may be supplied by one of control assemblies 300, 400, 500, 600, 700, 1400, or 1600. A guide bracket 15a connected about faucet 11 to base bracket 16a includes a notch 72 that maintains the position of lobe 73 within notch 72 when rotator bracket 70 is tilted. A temperature indicator 60 may be attached to lever 17a.

As discussed earlier with regard to FIG. 1, in FIG. 11A, cable 8 is surrounded by a cable housing 69, which allows the cable 8 to be serpentine between cover 11b and an associated control assembly (e.g., any of the flow control assembly embodiments), with cable housing 69 ending at the housing or cover (e.g., cover 11a, FIG. 11A) and cable 8 passing through to the point of attachment (e.g., lever 17a, FIG. 11A) at the actuator assembly end and, at the control assembly end, cable housing 69 ending at the cover (e.g., cover 18, FIG. 3, and cable 8 passing through to the point of attachment (e.g., flange 306, FIG. 3).

Figure 11B:
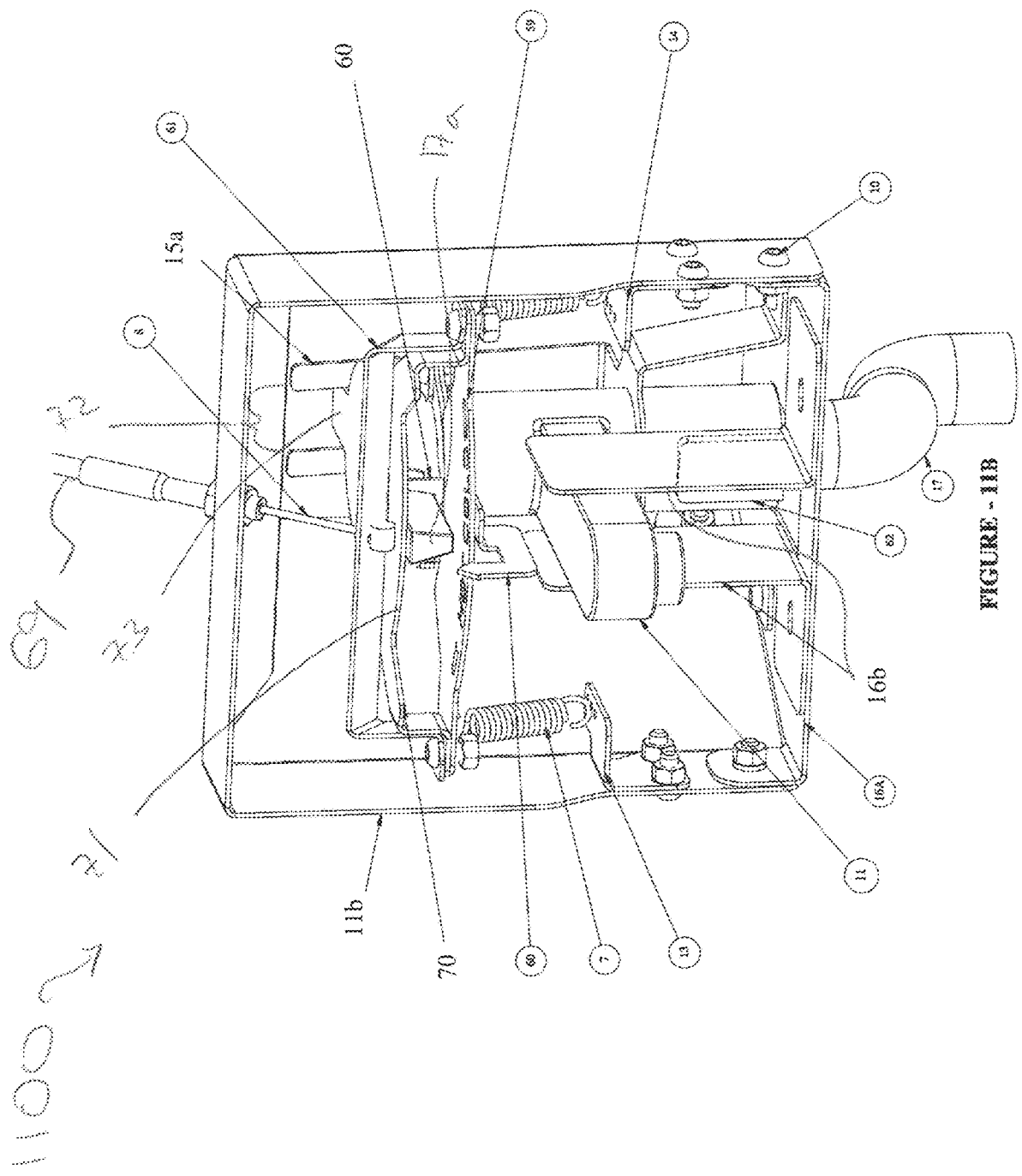
FIG. 11B is a front right perspective view illustrating the embodiment of FIG. 11A.

FIG. 11B is a front right perspective view illustrating the embodiment of FIG. 11A. FIG. 11B further illustrates the features of FIG. 11A, including optional bend pipe 17. Bend pipe 17 adds distance from faucet 11 to a wall (not shown) behind faucet 11. The distance from a wall provided by bend pipe 17 may facilitate the installation of assembly 1100 in instances where faucet 11 is otherwise too close to the wall.

FIG. 11B also illustrates an optional sensor 62, which may sense the presence or touch of the user and activate a mechanism (such as an electrically driven spool, not shown) that increases the tension of cable 8, such that faucet 11 is turned on or off. Sensor 62 senses the presence of the user's hand and sends an input to a drive mechanism, e.g., a motorized spool, to adjust tension in cable 8 and control the flow.

Figure 12A:
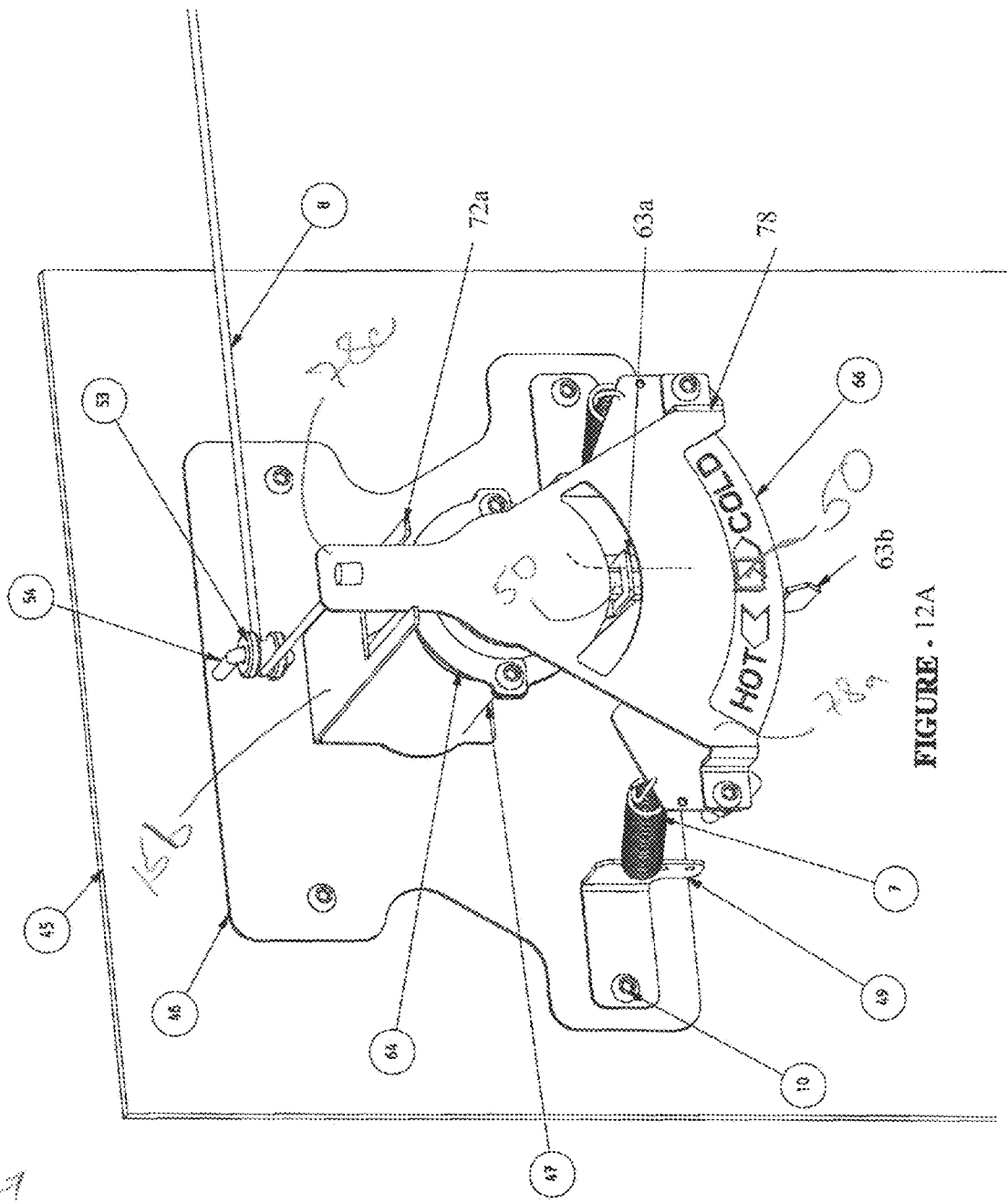
FIG. 12A is a front left perspective view illustrating an embodiment of a water temperature and flow actuator assembly.

FIG. 12A is a front left perspective view illustrating an embodiment of a water flow actuator assembly 1200 in the use case of a shower installation with a shower handle 50 atop a shower faucet 47. In FIG. 12A, water flow actuator assembly 1200 provides for controlling the flow of valve 47 (the same faucet as in FIG. 8), in which a lever 50 is rotated about a vertical axis to adjust the water temperature, and tilted with respect to a horizontal plane to adjust flow. For reference, flow actuator assembly 1200 and flow actuator assembly 800 (FIG. 2) operate and are controlled similarly with regard to water flow, with the major exception being that flow actuator assembly 1200 provides access to lever 50 for the user to adjust temperature. That is, flow actuator assembly 1200 controls the flow of valve 47 by cable 8 working in opposition to actuator springs 7 to tilt lever 17*a* within a rotator bracket 78 with respect to the horizontal plane.

Figure 12B:
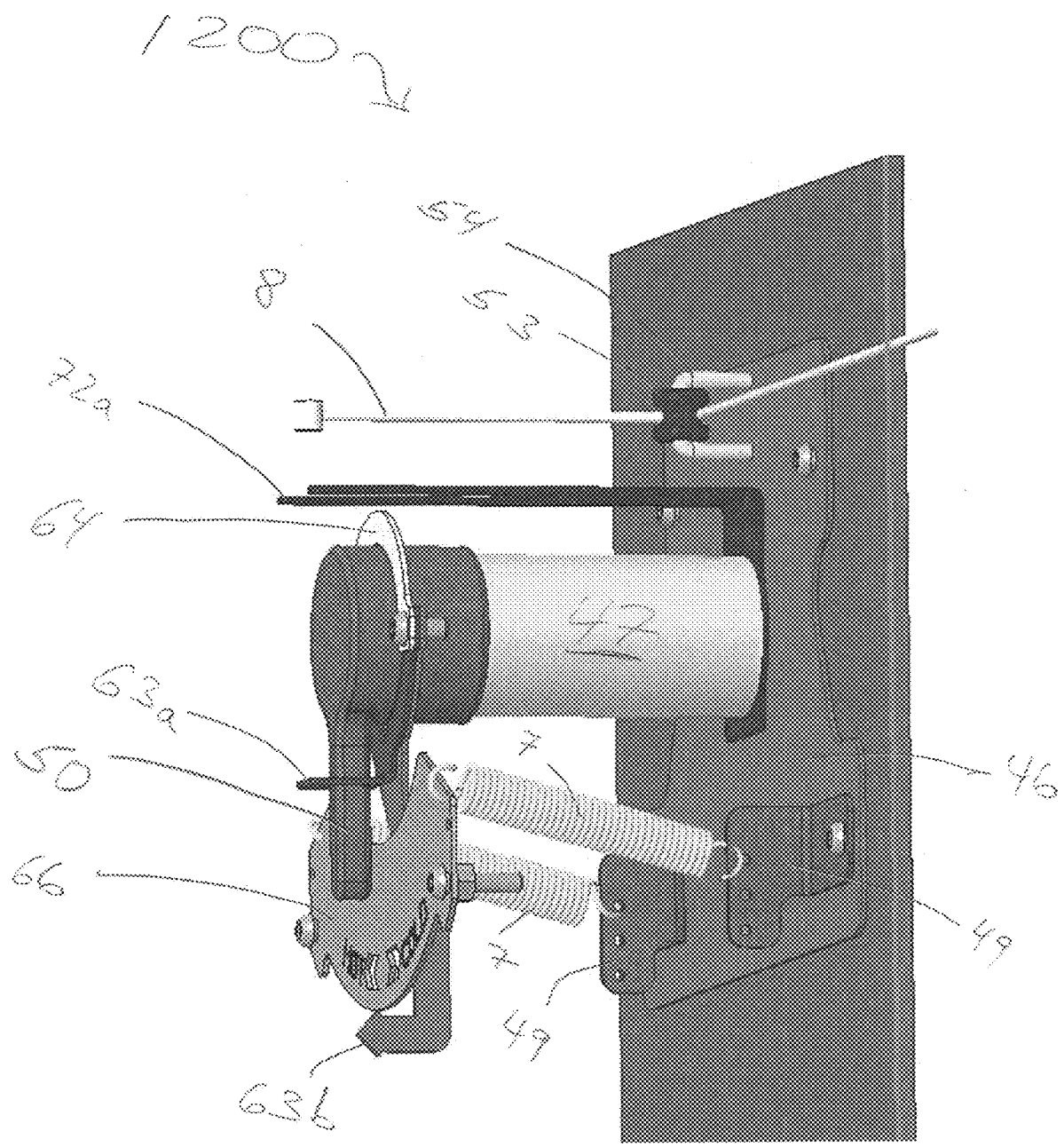
FIG. 12B is a front right perspective view of aspects of the embodiment of FIG. 12A.

In FIG. 12A, shower valve 47 includes shower lever 50, which rotates about a horizontal axis defined by valve 47 to adjust temperate and tilts with respect to a vertical plane (i.e., the lower part of lever 50 moves toward or from wall 45) to adjust flow. Flow actuator assembly 1200 includes mounting bracket 46 provided about valve 47 and a shower handle bracket 64 cooperating with a bracket 63*a* to connect to handle 50. For further reference, shower handle bracket 64 and bracket 63*a* are shown in FIG. 12B. Shower handle bracket 64 and 63*a* are affixed about the top of valve 47 such that they move with lever 50.

A rotator bracket 78, including an outer bracket 78*a* and a lower display plate bracket 66, is mounted about lever 50. Bracket 78 is affixed about lever 50 such that lever 50 may be rotated within bracket 78 by the user to adjust temperature, and such that lever 50 tilts with bracket 78 when bracket 78 is tilted by the actions of cable 8 and springs 7. In other words, rotator bracket 78 is connected to lever 50 such that lever 50 may move within rotator bracket 78 about the horizontal axis when acted upon by the user; however, lever 50 is constrained to tilt with rotator bracket 78 with respect to the horizontal plane when bracket 78 is acted upon by cable 8 or actuator springs 7.

Water flow actuator assembly 1200 includes spring brackets 49 (a second spring bracket is included on the hidden side of assembly 1200, as is shown with respect to assembly 200) connected to springs 7, which are connected to lower display plate bracket 66 of rotator bracket 78. Cable 8 is connected through a port (not shown) in a cover 55 (FIG. 13) to a rear lobe 78*c* rotator bracket 78. The angle of the connection of cable 8 to rear lobe 78*c* is determined by being routed about a roller pulley 53 (attached to bracket 46 by a mount 54) so that tension in cable 8 draws rear lobe 78*c* toward wall 45, tilting lever 50 outward and increasing flow. A guide bracket 15*b* connected about valve 47 to wall bracket 46 includes a notch 72*a* that maintains the position of lobe 78*c* within notch 72*a* when rotator bracket 78 is tilted. A temperature indicator 63*b* may be attached to lever 50.

In an embodiment, a positioning bracket 50*a* (see FIG. 8) may be connected to the faucet-side of outer bracket 78*a*. Positioning bracket 50*a* encircles enough of lever 50 to maintain lever 50 in the proper position (shown) without preventing lever 50 from being rotated to adjust temperature.

Flow actuator assembly 800 works to adjust the flow and temperature of valve 47 as follows. In the normally-closed configuration shown, tension in actuator springs 7 is increased when rotator bracket 78 is tilted outward due to a sufficient increase in tension in cable 8. Flow control is provided by cable 8 working in opposition to actuator springs 7 to tilt rotator bracket 78 (and lever 50 within) with respect to the vertical plane of wall 45.

FIG. 12B is a front right perspective view of aspects of the embodiment of FIG. 12A. FIG. 12B further illustrates the connection of the connection of brackets 64, 63*a*, and 63*b* to handle 50, i.e., that shower handle bracket 64, 63*a*, and 63*b* are affixed about the top of valve 47 such that they move with lever 50, with bracket 63*b* indicating a temperature setting with respect to displate plate bracket 66.

Figure 13:
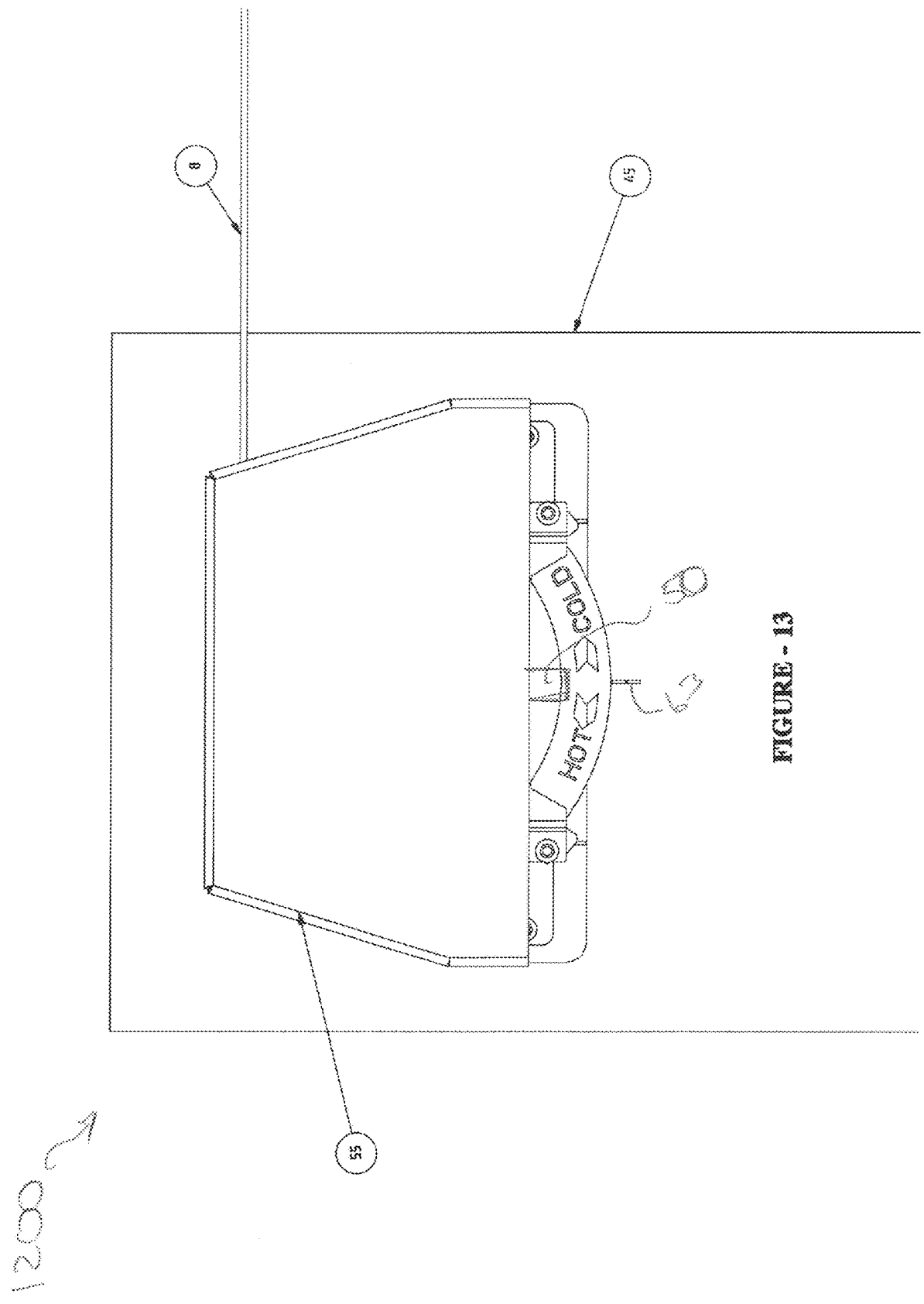
FIG. 13 is a front view illustrating aspects of the embodiment of the embodiment of FIG. 12A.

FIG. 13 is a front view illustrating aspects of the embodiment of water flow actuator assembly 1200 of FIG. 12A. In FIG. 13, flow actuator assembly 1200 is shown to include a cover 55, which includes a port (not shown) permitting the access of cable 8. A feature of the embodiment of FIG. 12A and FIG. 13 takes advantage of the tendency for a user of a shower to set the temperature once, thus reducing the need for a remote control of the shower temperature. As a result, flow actuator assembly 1200 may be made simpler and less costly by the removal of temperature control features.

Figure 14:
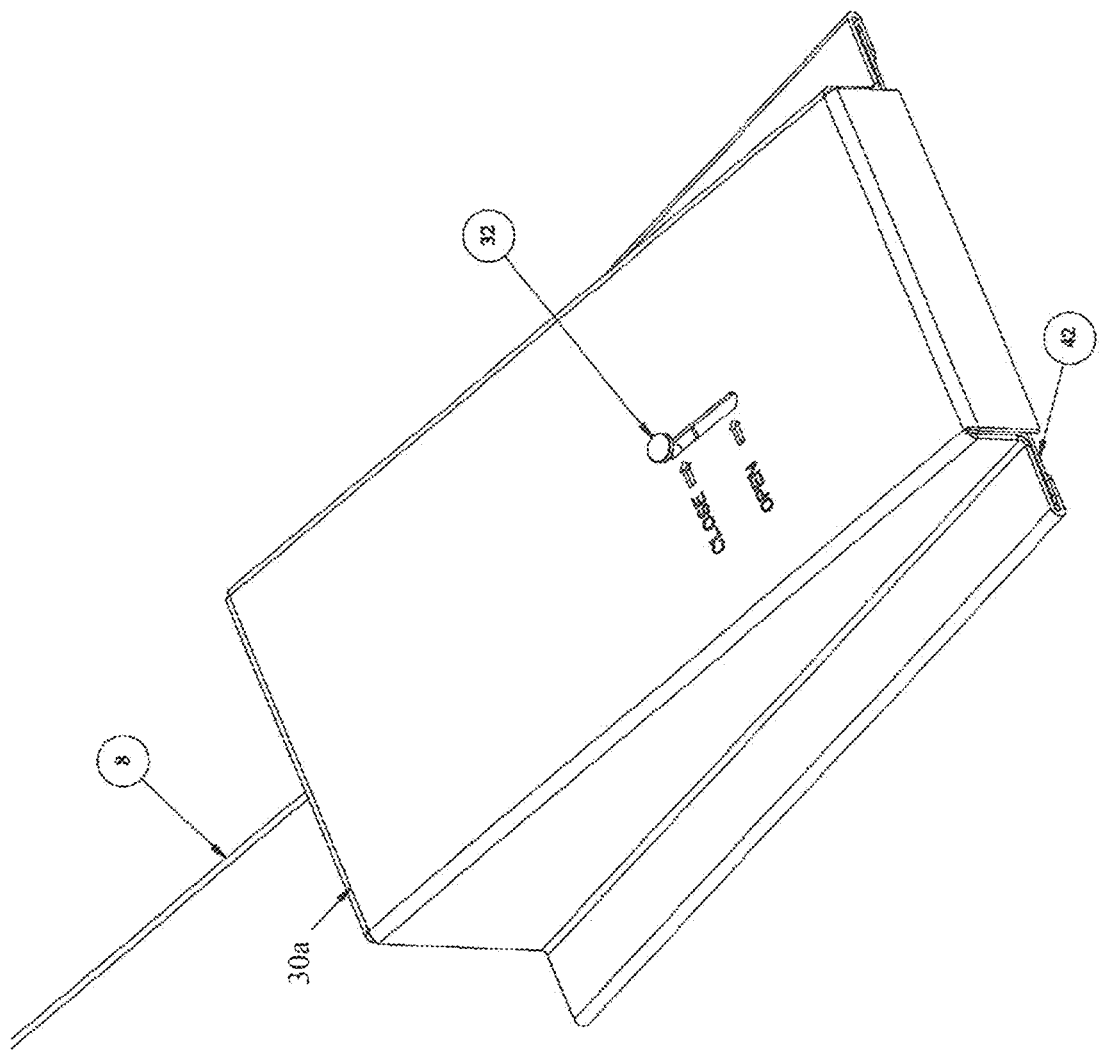
FIG. 14 is a front left perspective view illustrating an embodiment of a water flow control assembly.

FIG. 14 is a front left perspective view illustrating an embodiment of a water flow control assembly 1400. FIG. 14 illustrates that flow control assembly 700 of FIG. 6 may be separated from the remainder of flow control assembly 600 and housed in a separate cover 30*a* with stability-enhancing base flanges 42. Flow control assembly 1400 includes within it flow control assembly 700, which is described with regard to FIG. 7. Flow control assembly 1400 may be used to control to the flow of, e.g., flow actuator assemblies 100, 200, 800, 1100, 12000, 1500, 1800, and 1900.

Figure 15:
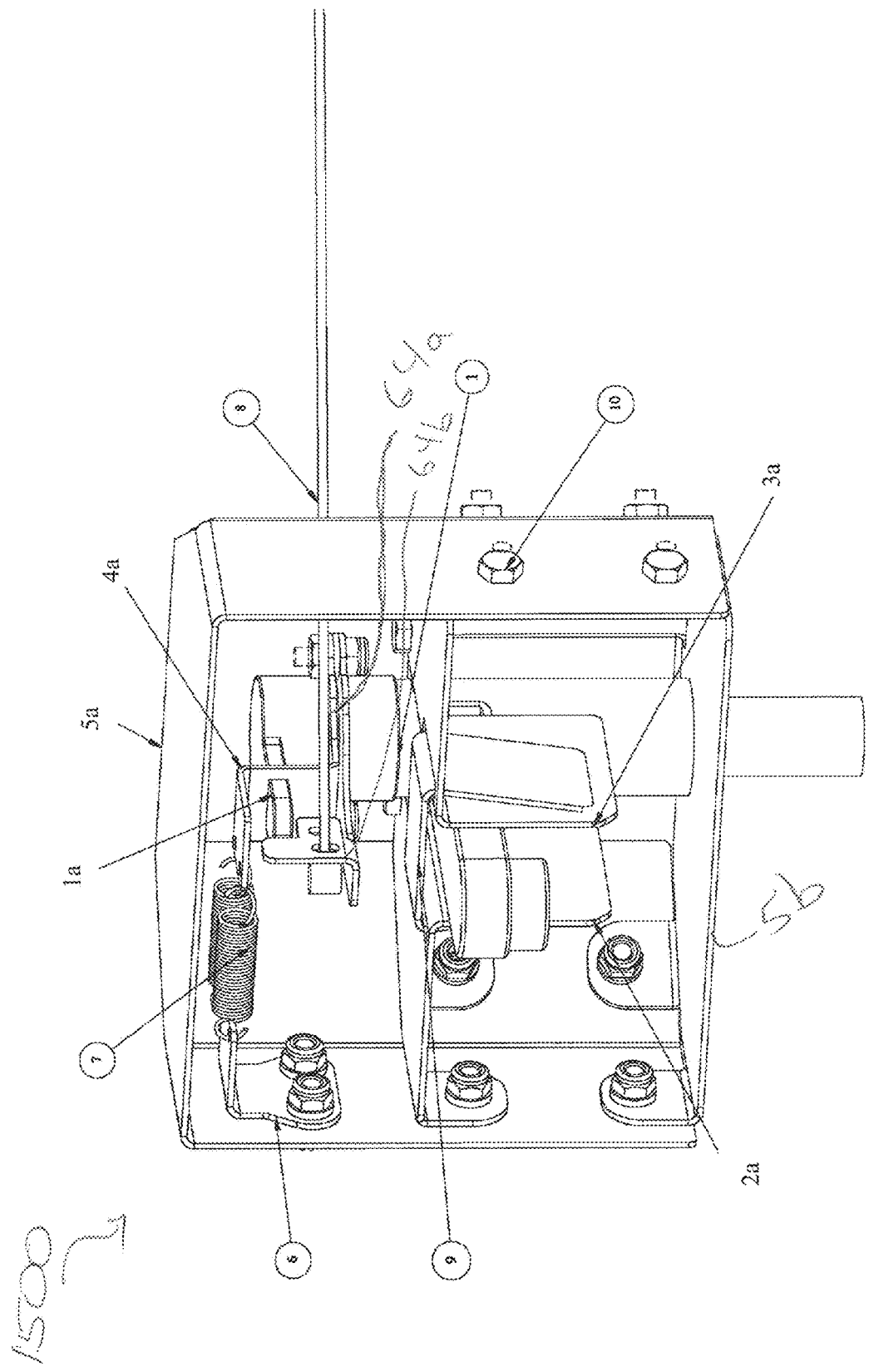
FIG. 15 is a front right perspective view illustrating an embodiment of a water flow actuator assembly.
Figure 57:
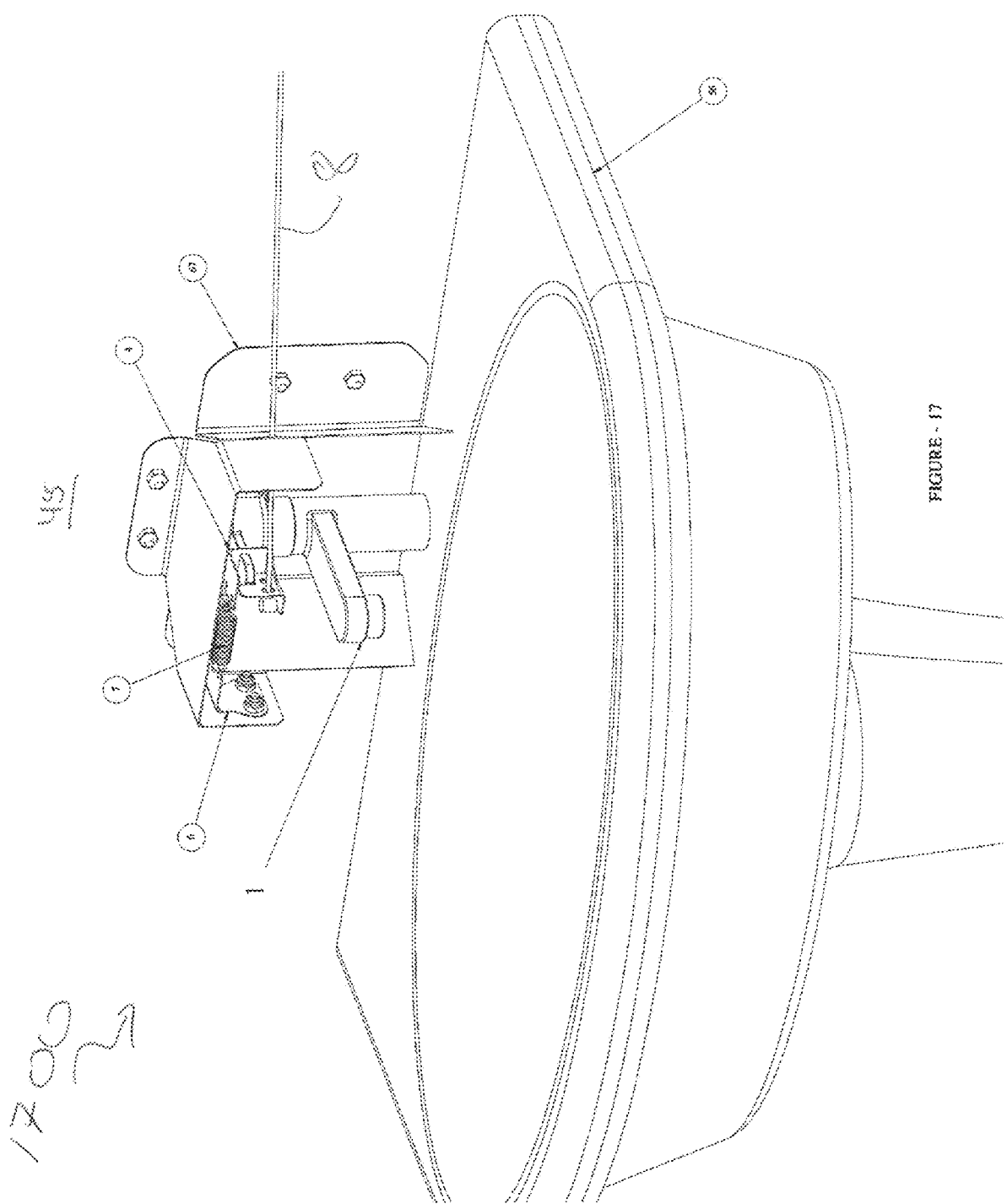

FIG. 15 is a front right perspective view illustrating an embodiment of a water flow actuator assembly 1500. Flow actuator assembly 1500 generally operates as described with regard to flow actuator assembly 100 of FIG. 1. The following discussion is directed, therefore, to the differences between actuator assemblies 1500 and 100.

Flow actuator assembly 1500 provides a lower profile than assembly 100. The lower profile is made possible by reorienting certain elements. In that regard, spring bracket 6 and spring bracket 4*a* are rotated 90 degrees with respect to cover 5*a* in comparison to the spring orientation of FIG. 1, which positions springs 7 horizontally and slightly lower with respect to handle 1*a*. Spring bracket 4*a* is also modified (in comparison to bracket 4 of FIG. 1) by being attached to a handle bracket 64*a* affixed to the top of faucet 1 such that handle bracket 64*a* moves with lever 1*a*. Extending from handle bracket 64*a* is a flange 64*b* to which cable 8 is connected. Thus, the action of cable 8 is transmitted to lever 1*a* through flange 64*b* and bracket 64*a*, instead of directly through bracket 4 as in FIG. 1. In FIG. 15, brackets 2*a*, 3*a* are shortened in comparison to brackets 2, 3 (FIG. 1), which further reduces the profile of cover 5*a* from a base 5*b*.

FIG. 16 is an upper front right perspective view illustrating an embodiment of a water flow control assembly 1600 and a use case for water flow actuator assembly 1500 paired with control assembly 302 to remotely operate faucet 1. In FIG. 16, flow actuator assembly 1500 is mounted directly to a washbasin 57 and pedestal 56. FIG. 16 illustrates that any of the flow control assembly embodiments disclosed may be paired with any of the flow actuator assembly embodiment disclosed. Similarly, any of the temperature control assemblies may be paired with any of temperature-controlling actuator embodiments disclosed.

FIG. 17 is a front right perspective view illustrating a use case for a water flow actuator assembly 1700. Flow actuator assembly 1700 generally operates as described with regard to flow actuator assembly 1500 of FIG. 15. The following discussion is directed, therefore, to the differences between actuator assemblies 1700 and 1500. FIG. 17 illustrates that cover 5*a* (FIG. 15) may be modified to mount the actuator assembly to wall 45 instead of washbasin 57 and pedestal 56. In that regard, actuator assembly 1700 includes a wall mount housing 67. Spring brackets 6 attach directly to wall mount housing 67 and cable 8 passes through a port (not shown) in wall mount housing 67. Assembly 1700 does not include faucet brackets 2*a*, 3*a*, with rigidity being supplied solely by wall mount 67.

FIG. 18 is a front right perspective view illustrating an embodiment of a water flow actuator assembly 1800. Flow actuator assembly 1800 generally operates as described with regard to flow actuator assembly 1100 of FIG. 11A and FIG. 11B. The following discussion is directed, therefore, to the differences between actuator assemblies 1800 and 1100. FIG. 18 illustrates that cover 11b (FIG. 11A) may be modified to mount the actuator assembly to wall 45 above washbasin 57 and pedestal 56. In that regard, actuator assembly 1800 includes a wall mount housing 68. Spring brackets 13, 14 attach directly to wall mount housing 68 and cable 8 passes through a port (not shown) in wall mount housing 68. Assembly 1800 does not include bracket flanges 16b, with rigidity being supplied solely by wall mount 68.

Figure 19:
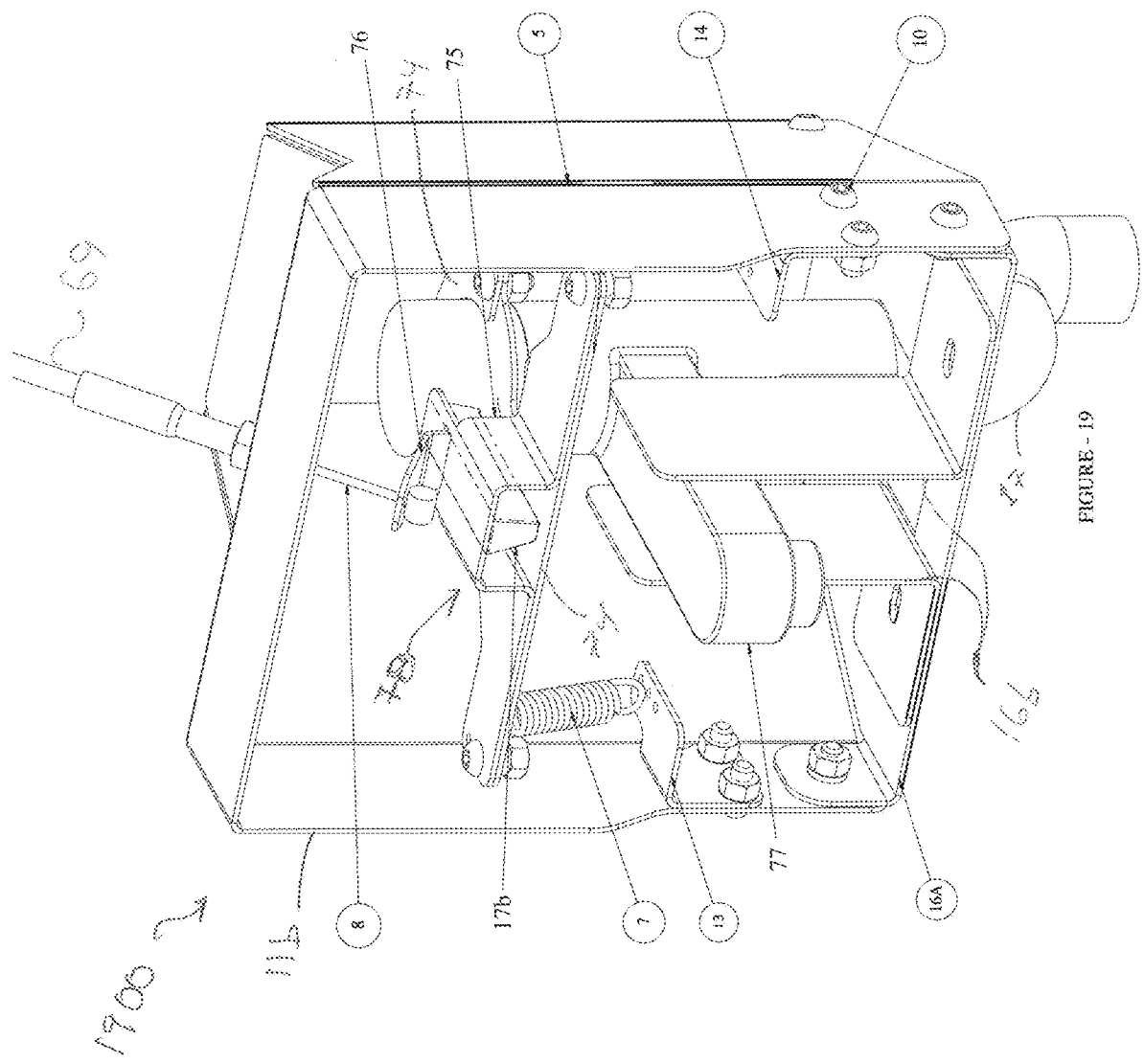
FIG. 19 is an upper front right perspective view illustrating an embodiment of a water flow actuator assembly.

FIG. 19 is an upper front right perspective view illustrating an embodiment of a water flow actuator assembly 1900. In FIG. 19, water flow actuator assembly 1900 provides for controlling the flow of faucet 77, in which a lever 17b is tilted with respect to the horizontal plane to adjust flow. For reference, flow actuator assembly 1900 and flow actuator assembly 1100 (FIG. 11A) operate and are controlled similarly with regard to water flow, with the major exception being that flow actuator assembly 1100 allows the user to adjust temperature. That is, flow actuator assembly 1900 controls the flow of faucet 77 by cable 8 working in opposition to actuator springs 7 to tilt lever 17b within a tilting bracket 78 (including an upper bracket 75 and a lower bracket 74) with respect to the horizontal plane.

In FIG. 19, water flow actuator assembly 1900 includes a cover 11b connected to a bottom bracket 16a with using fasteners 10 and attached to faucet 77. Bracket flanges 16b of bracket 16a further stabilize assembly 1900 about faucet 77. Bracket 78 includes an upper bracket 75 and a lower bracket 74. Bracket 78 is affixed about lever 17b such that lever 17b tilts with bracket 78 when bracket 78 is tilted by the actions of cable 8 and springs 7. In other words, lever 17b is constrained to tilt with bracket 78 with respect to the horizontal plane when bracket 78 is acted upon by cable 8 or actuator springs 7. Actuator springs 7 are connected to cover 11b by spring brackets 13, 14. Cable 8 is connected through a port (not shown) in cover 11b to a cable bracket 76 connected to upper bracket 75. The angle of the connection of cable 8 to cable bracket 76 is configured so that tension in cable 8 draws cable bracket 76 upward, tilting lever 17b upward and increasing flow. In the normally-closed configuration shown, tension in actuator springs 7 is overcome and tilting bracket 78 is tilted upward by a sufficient increase in tension in cable 8, which may be supplied by one of control assemblies 300, 400, 500, 600, 700, 1400, or 1600.

As discussed earlier with regard to FIG. 1 and FIG. 11A, in FIG. 19, cable 8 is surrounded by a cable housing 69, which allows the cable 8 to be serpentine between cover 11b and an associated control assembly (e.g., any of the flow control assembly embodiments), with cable housing 69 ending at the housing or cover (e.g., cover 11a, FIG. 11A) and cable 8 passing through to the point of attachment (e.g., bracket 76, FIG. 19) at the actuator assembly end and, at the control assembly end, cable housing 69 ending at the cover (e.g., cover 18, FIG. 3) and cable 8 passing through to the point of attachment (e.g., flange 306, FIG. 3).

FIG. 20 is a is an upper front right perspective view illustrating a use case for embodiments of water flow control and actuator assemblies. FIG. 20 illustrates a use case in which an actuator assembly may be housed in an actuator housing 2000 and mounted remotely from sink 57. In the use case, water is provided to sink 57 through a pipe extending from the valve or faucet and from housing 2000. As shown, control assembly 302 is shown to control the actuator assembly housed within housing 2000. Such single cable control is appropriate for actuator assemblies 100, 1500, 1700, and 1900. Similarly, for single cable control, control assembly 700 may also be used. For actuator assemblies that also include temperature control (e.g., actuator assemblies 200 and 800), a three-cable control assembly as depicted in FIGS. 4, 5, and 6, may be employed.

All the above actuator and control assemblies may be overridden manually, as an option if the control device has a malfunction. That is, manual operation of the various faucet levers may still be used to control flow and temperature.

One of skill will understand that the various covers and mounting brackets are described with reference to the embodiments disclosed generally represent structures that are fixed in position with respect to the faucet or valve and/or associated lever such that the structures provide a base to which springs 7 may be attached, and/or through which cables 8, 8a, 8b may be routed.

One of skill will understand that, in each of the embodiments above, the lever controls a valve (FIG. 8, and FIG. 12A) or a valve/faucet combination (all other figures). While these descriptions generally referred to horizontal and vertical planes and axes, the use of "horizontal" and "vertical" was for convenience, since the orientations were represented by the various drawings. However, one of skill will understand that the lever motions discussed are equally effective if the faucets and valves were oriented otherwise. Thus, the descriptions should be understood as applying to the motion of the levers with respect to the valve, regardless of the valve's orientation within Earth's inertial reference frame. As a result, lever 50 of valve 47 (FIG. 8 and FIG. 12A) controls flow when tilted with respect to an axis defined by valve 47 (which is horizontal in FIG. 8 and FIG. 12A), levers 17 controls flow when tilted with respect to an axis defined by the valve within faucet 11 (which is vertical in FIG. 2, FIG. 11A, FIG. 11B, FIG. 18, and FIG. 19), and lever 1a controls flow when rotated about an axis defined by the valve within faucet 1 (which is vertical in FIG. 1, FIG. 15, and FIG. 17). Similarly, temperature control is accomplished by rotating levers 17a, 50a, about the axes defined by their respective valve.

In the embodiments, the pedal associated with each control assembly should be understood to represent any shape of pedal that may be moved to adjust tension in the attached cable and that the pedals may take any arbitrary form as desired to facilitate their actuation. Thus, the various control assemblies should be understood to be mountable in other orientations and pedals configured to facilitate actuation in the different orientation.

In the previous disclosure, the various embodiments may have been described with reference to a faucet or valve associated with a wash basin or shower. However, one of skill will understand that an embodiment described with reference to a wash basin may also be employed in a shower and vice versa, or to control or actuate other types of valves. Thus, description of an embodiment with respect to a faucet or a shower valve in a wash basin or shower should be understood as a description of the embodiment in the context of a use case, and not as limiting that embodiment to that particular use case.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus comprising:
   a valve having a control lever movable between an open position and a closed position to control a flow;
   a first structure in a fixed position with respect to the valve;
   a first spring connected between an end of the control lever and the first structure; and
   a first cable connected to the control lever,
   wherein the connection between the first cable and the control lever is configured such that:
   without tension in the first cable, the first spring maintains the control lever in the closed position;
   when the first cable is provided with sufficient tension to overcome the first spring, the control lever moves toward the open position; and
   when the control lever is not in the closed position and there is no tension in the first cable, the first spring is configured to force the control lever to the closed position.

2. The apparatus of claim 1, further comprising:
   a first pedal connected to the first cable and pivotable with respect to a second structure, wherein pivoting the first pedal with respect to the second structure creates tension in the first cable.

3. The apparatus of claim 1, further comprising:
   a first pedal connected to the first cable and slidable with respect to a second structure, wherein sliding the first pedal with respect to the second structure creates tension in the first cable.

4. The apparatus of claim 1, wherein:
   the control lever rotates about a first axis defined by a valve body when moving between the open position and the closed position.

5. The apparatus of claim 1, wherein:
   the control lever tilts with respect to a first axis defined by a valve body when moving between the open position and the closed position.

6. The apparatus of claim 5, wherein the control lever is rotatable about the first axis between a first position and a second position to control a temperature of the flow, the apparatus further comprising:
   a bracket connected to the lever between the lever and the spring, and connected between the lever and the first cable, the bracket configured to allow the lever to rotate with respect to the first axis and configured to constrain the lever to move with the bracket when the bracket tilts with respect to the first axis;
   a second cable connected to a first end of the lever;
   a third cable connected to a second end of the lever, wherein:
   when the second cable is provided with sufficiently more tension than the third cable, the control lever moves toward the first position; and
   when the third cable is provided with sufficiently more tension than the second cable, the control lever moves toward the second position.

7. The apparatus of claim 6,
   a second pedal connected to the second cable and the third cable and pivotable with respect to a second structure, wherein pivoting the second pedal with respect to the second structure creates in a first direction creates more tension in the second cable than in the third cable, and pivoting the second pedal with respect to the second structure in a second direction creates more tension in the third cable than in the second cable.

8. The apparatus of claim 6, wherein:
   the bracket includes a first plate and a second plate with an end of the lever positioned between the first plate and the second plate;
   the bracket being configured to allow the lever to rotate with respect to the first axis includes the end of the lever being moveable between the first plate and the second plate to allow the lever to rotate with respect to the first axis; and
   the bracket being configured to constrain the lever to move with the bracket when the bracket tilts with respect to the first axis includes the end of the lever being forced to tilt with respect to the first axis by either the first plate or the second plate when the bracket tilts with respect to the first axis.

9. The apparatus of claim 5, wherein the control lever is rotatable about the first axis between a first position and a second position to control a temperature of the flow, the apparatus further comprising:
   a bracket connected to the lever between the lever and the spring, and connected between the lever and the first cable, the bracket configured to allow the lever to rotate with respect to the first axis and configured to constrain the lever to move with the bracket when the bracket tilts with respect to the first axis, wherein:
   the lever remains accessible such that a user may rotate the lever to control the temperature.

10. The apparatus of claim h further comprising:
    a housing covering the valve and configured to admit the first cable, and
    a pipe connected to the valve and extending to a wash basin or shower.

11. A kit for connecting to a valve having a control lever movable between an open position and a closed position to control a flow, the kit comprising:

a first structure mountable in a fixed position with respect to the valve;
a first spring connectable between an end of the control lever and the first structure; and
a first cable connectable to the control lever,
wherein, when connected, the connection between the first cable and the control lever is configured such that:
without tension in the first cable, the first spring maintains the control lever in the closed position;
when the first cable is provided with sufficient tension to overcome the first spring, the control lever moves toward the open position; and
when the control lever is not in the closed position and there is no tension in the first cable, the first spring is configured to force the control lever to the closed position.

12. The kit of claim 11, further comprising:
a first pedal connectable to the first cable and pivotable with respect to a second structure, wherein, when connected, pivoting the first pedal with respect to the second structure creates tension in the first cable.

13. The kit of claim 11, further comprising:
a first pedal connectable to the first cable and slidable with respect to a second structure, wherein, when connected, sliding the first pedal with respect to the second structure creates tension in the first cable.

14. The kit of claim 11, wherein:
the control lever rotates about a first axis defined by a valve body when moving between the open position and the closed position.

15. The kit of claim 11, wherein:
the control lever tilts with respect to a first axis defined by a valve body when moving between the open position and the closed position.

16. The kit of claim 15, wherein the control lever is rotatable about the first axis between a first position and a second position to control a temperature of the flow, the kit further comprising:
a bracket connectable to the lever between the lever and the spring, and between the lever and the first cable, the bracket configured, when connected, to allow the lever to rotate with respect to the first axis and to constrain the lever to move with the bracket when the bracket tilts with respect to the first axis;
a second cable connectable to a first end of the lever;
a third cable connectable to a second end of the lever, wherein:
when the second cable is connected and provided with sufficiently more tension than the third cable, the control lever moves toward the first position; and
when the third cable is connected and provided with sufficiently more tension than the second cable, the control lever moves toward the second position.

17. The kit of claim 16,
a second pedal connectable to the second cable and the third cable and pivotable with respect to a second structure, wherein, when connected, pivoting the second pedal with respect to the second structure creates in a first direction creates more tension in the second cable than in the third cable, and pivoting the second pedal with respect to the second structure in a second direction creates more tension in the third cable than in the second cable.

18. The kit of claim 16, wherein:
the bracket includes a first plate and a second plate configured, when the kit is connected to the valve, such that the lever is positioned between the first plate and the second plate;
the bracket being configured to allow the lever to rotate with respect to the first axis includes the end of the lever being moveable between the first plate and the second plate to allow the lever to rotate with respect to the first axis; and
the bracket being configured to constrain the lever to move with the bracket when the bracket tilts with respect to the first axis includes the end of the lever being forced to tilt with respect to the first axis by either the first plate or the second plate when the bracket tilts with respect to the first axis.

19. The kit of claim 11, wherein the control lever is rotatable about the first axis between a first position and a second position to control a temperature of the flow, the kit further comprising:
a bracket connectable to the lever between the lever and the spring, and between the lever and the first cable, the bracket configured, when connected, to allow the lever to rotate with respect to the first axis and configured to constrain the lever to move with the bracket when the bracket tilts with respect to the first axis, wherein:
when the kit is assembled to the valve the lever remains accessible such that a user may rotate the lever to control the temperature.

20. The kit of claim 11, further comprising:
a housing configured to cover the valve and to admit the first cable, and
a pipe configured to connect to the valve and extend to a wash basin or shower.

* * * * *